United States Patent
Rivard et al.

(10) Patent No.: US 11,394,895 B2
(45) Date of Patent: Jul. 19, 2022

(54) SYSTEM AND METHOD FOR GENERATING A DIGITAL IMAGE

(71) Applicant: Duelight LLC, Sunnyvale, CA (US)

(72) Inventors: William Rivard, Menlo Park, CA (US); Adam Feder, Mountain View, CA (US); Brian Kindle, Sunnyvale, CA (US)

(73) Assignee: DUELIGHT LLC, Sunnyvale, CA (US)

( * ) Notice: Subject to any disclaimer, the term of this patent is extended or adjusted under 35 U.S.C. 154(b) by 0 days.

(21) Appl. No.: 16/677,385

(22) Filed: Nov. 7, 2019

(65) Prior Publication Data
US 2020/0077013 A1   Mar. 5, 2020

Related U.S. Application Data

(63) Continuation of application No. 16/211,931, filed on Dec. 6, 2018, now Pat. No. 10,491,834, which is a (Continued)

(51) Int. Cl.
*H04N 5/235* (2006.01)
*H04N 5/225* (2006.01)
*H04N 5/232* (2006.01)

(52) U.S. Cl.
CPC ......... *H04N 5/2356* (2013.01); *H04N 5/2256* (2013.01); *H04N 5/2352* (2013.01); (Continued)

(58) Field of Classification Search
CPC ........... H04N 5/2356; H04N 5/232933; H04N 5/2355; H04N 5/2354; H04N 5/2352; H04N 5/2256; H04N 5/23216; H04N 5/23293
See application file for complete search history.

(56) References Cited

U.S. PATENT DOCUMENTS 6,744,471 B1 * 6/2004 Kakinuma ........... H04N 5/2354
348/E5.037
8,339,508 B2   12/2012 Levy
(Continued)

OTHER PUBLICATIONS

Final Office Action from U.S. Appl. No. 14/178,305, dated May 18, 2015.
(Continued)

*Primary Examiner* — Lin Ye
*Assistant Examiner* — John H Morehead, III
(74) *Attorney, Agent, or Firm* — Zilka-Kotab, P.C.

(57) ABSTRACT

A system, method, and computer program product for generating a digital image. The method comprises receiving a shutter release command and causing a camera module to sample a first image of a photographic scene based on a first set of sampling parameters in response to the shutter release command. Next, the first image within an image set is stored and a camera module is caused to sample a second image of the photographic scene based on a second set of sampling parameters in response to the shutter release command. Additionally, the second image within the image set is stored, and a strobe intensity value is specified based on a measured exposure for images in the image set. Lastly, a strobe unit is configured based on the strobe intensity value, and in response to configuring the strobe unit, the camera module is caused to sample a final image.

20 Claims, 19 Drawing Sheets

Related U.S. Application Data continuation of application No. 15/863,785, filed on Jan. 5, 2018, now Pat. No. 10,178,323, which is a continuation of application No. 15/289,039, filed on Oct. 7, 2016, now Pat. No. 9,894,289, which is a continuation of application No. 14/543,782, filed on Nov. 17, 2014, now Pat. No. 9,509,919.

(52) U.S. Cl.
CPC ......... *H04N 5/2354* (2013.01); *H04N 5/2355* (2013.01); *H04N 5/23216* (2013.01); *H04N 5/232933* (2018.08)

(56) References Cited

U.S. PATENT DOCUMENTS

| | | | |
|---|---|---|---|
| 9,509,919 | B2 | 11/2016 | Rivard et al. |
| 9,560,269 | B2 | 1/2017 | Baldwin |
| 9,894,289 | B2 | 2/2018 | Rivard et al. |
| 10,178,323 | B2 | 1/2019 | Rivard et al. |
| 10,491,834 | B2 | 11/2019 | Rivard et al. |
| 2004/0145674 | A1* | 7/2004 | Hoppe ................. H04N 5/2354 396/173 |
| 2005/0088570 | A1 | 4/2005 | Seo |
| 2006/0181614 | A1 | 8/2006 | Yen et al. |
| 2007/0025717 | A1 | 2/2007 | Raskar et al. |
| 2007/0025720 | A1 | 2/2007 | Raskar et al. |
| 2007/0189748 | A1* | 8/2007 | Drimbarean ............. G06T 5/20 396/89 |
| 2007/0264000 | A1* | 11/2007 | Hsieh ...................... G03B 7/16 348/E5.038 |
| 2008/0019680 | A1* | 1/2008 | Kasahara ........... H04N 5/23277 396/48 |
| 2008/0298794 | A1* | 12/2008 | Subbotin ............. H04N 5/2354 396/164 |
| 2009/0009636 | A1* | 1/2009 | Endo .................... H04N 5/2354 348/E5.022 |
| 2009/0175555 | A1 | 7/2009 | Mahowald |
| 2010/0157079 | A1 | 6/2010 | Atanassov et al. |
| 2010/0165178 | A1* | 7/2010 | Chou ..................... G03B 13/32 348/E5.022 |
| 2010/0165181 | A1 | 7/2010 | Murakami et al. |
| 2010/0194963 | A1 | 8/2010 | Terashima |
| 2012/0026359 | A1* | 2/2012 | Fukushima .......... H04N 5/2351 348/226.1 |
| 2012/0057051 | A1 | 3/2012 | Ito et al. |
| 2012/0224042 | A1* | 9/2012 | Saijo ........................ G06T 7/11 348/E7.085 |
| 2012/0242844 | A1 | 9/2012 | Walker et al. |
| 2012/0274806 | A1 | 11/2012 | Mori |
| 2013/0179831 | A1 | 7/2013 | Izaki |
| 2013/0239057 | A1* | 9/2013 | Ubillos ................ G06F 3/0485 715/833 |
| 2013/0241442 | A1* | 9/2013 | Trattler ................... G03B 15/05 315/307 |
| 2014/0176750 | A1 | 6/2014 | Pajak et al. |
| 2014/0176757 | A1 | 6/2014 | Rivard et al. |
| 2014/0186050 | A1* | 7/2014 | Oshima ................ H04B 10/116 398/118 |
| 2014/0247342 | A1* | 9/2014 | Ellenby .............. H04N 5/23222 715/709 |
| 2014/0267833 | A1 | 9/2014 | Chen et al. |
| 2014/0307117 | A1* | 10/2014 | Feng .................... H04N 5/2351 348/218.1 |
| 2014/0375837 | A1* | 12/2014 | Ichihara ............... H04N 5/2352 348/222.1 |
| 2015/0015740 | A1* | 1/2015 | Cho ..................... H04N 5/2351 348/234 |
| 2015/0077603 | A1 | 3/2015 | Matsuzawa et al. |
| 2015/0229819 | A1* | 8/2015 | Rivard ................. H04N 5/2351 348/362 |
| 2016/0142610 | A1 | 5/2016 | Rivard et al. |
| 2016/0248968 | A1 | 8/2016 | Baldwin |
| 2017/0026562 | A1 | 1/2017 | Rivard et al. |
| 2017/0048442 | A1 | 2/2017 | Cote et al. |
| 2018/0131855 | A1 | 5/2018 | Rivard et al. |
| 2019/0109974 | A1 | 4/2019 | Rivard et al. |

OTHER PUBLICATIONS

Non-Final Office Action from U.S. Appl. No. 14/178,305, dated Aug. 11, 2014.
U.S. Appl. No. 14/178,305, filed Feb. 12, 2014.
Rivard et al., U.S. Appl. No. 16/211,931, filed Dec. 6, 2018.
Non-Final Office Action from U.S. Appl. No. 16/211,931, dated Apr. 5, 2019.
Notice of Allowance from U.S. Appl. No. 16/211,931, dated Aug. 2, 2019.
Rivard et al., U.S. Appl. No. 14/543,782, filed Nov. 17, 2014.
Non-Final Office Action from U.S. Appl. No. 14/543,782, dated Dec. 3, 2015.
Notice of Allowance from U.S. Appl. No. 14/543,782, dated Jul. 7, 2016.
Rivard et al., U.S. Appl. No. 15/289,039, filed Oct. 7, 2016.
Non-Final Office Action from U.S. Appl. No. 15/289,039, dated May 11, 2017.
Notice of Allowance from U.S. Appl. No. 15/289,039, dated Oct. 12, 2017.
Rivard et al., U.S. Appl. No. 15/863,785, filed Jan. 5, 2018.
Non-Final Office Action from U.S. Appl. No. 15/863,785, dated Apr. 11, 2018.
Notice of Allowance from U.S. Appl. No. 15/863,785, dated Sep. 11, 2018.
Rivard et al., U.S. Appl. No. 17/518,473, filed Nov. 3, 2021.
Rivard et al., U.S. Appl. No. 17/694,441, filed Mar. 14, 2022.

* cited by examiner

SYSTEM AND METHOD FOR GENERATING A DIGITAL IMAGE

RELATED APPLICATIONS

This application is a continuation of and claims priority to U.S. patent application Ser. No. 16/211,931, filed Dec. 6, 2018, titled "SYSTEM AND METHOD FOR GENERATING A DIGITAL IMAGE," which in turn is a continuation of and claims priority to U.S. patent application Ser. No. 15/863,785, filed Jan. 5, 2018, now U.S. Pat. No. 10,178,323 titled "SYSTEM AND METHOD FOR GENERATING A DIGITAL IMAGE," which in turn is a continuation of and claims priority to U.S. patent application Ser. No. 15/289,039, filed Oct. 7, 2016, now U.S. Pat. No. 9,894,289, titled "SYSTEM AND METHOD FOR GENERATING A DIGITAL IMAGE," which in turn is a continuation of and claims priority to U.S. patent application Ser. No. 14/543,782, filed Nov. 17, 2014, now U.S. Pat. No. 9,509,919, titled "SYSTEM AND METHOD FOR GENERATING A DIGITAL IMAGE," where each of the foregoing applications are incorporated by reference for all purposes.

This application is related to the following U.S. patent application, the entire disclosure being incorporated by reference herein: application Ser. No. 14/178,305, filed Feb. 12, 2014, entitled "SYSTEMS AND METHOD FOR GENERATING A DIGITAL IMAGE."

FIELD OF THE INVENTION

The present invention relates generally to digital photographic systems, and more specifically to a system, method, and computer program product for generating a digital image.

BACKGROUND

Traditional digital photography systems are inherently limited by the dynamic range of a capturing image sensor. One solution to such limitation is the use of high dynamic-range (HDR) photography. HDR photography involves capturing multiple exposures of a same scene, where each of the exposures is exposed differently, and then merging the multiple captures to create an image with a larger dynamic range.

SUMMARY

A system, method, and computer program product for generating digital image. The method comprises receiving a shutter release command and causing a camera module to sample a first image of a photographic scene based on a first set of sampling parameters in response to the shutter release command. Next, the first image within an image set is stored and a camera module is caused to sample a second image of the photographic scene based on a second set of sampling parameters in response to the shutter release command. Additionally, the second image within the image set is stored, and a strobe intensity value is specified based on a measured exposure for images in the image set. Lastly, a strobe unit is configured based on the strobe intensity value, and in response to configuring the strobe unit, the camera module is caused to sample a final image.

DETAILED DESCRIPTION

Figure 1A:
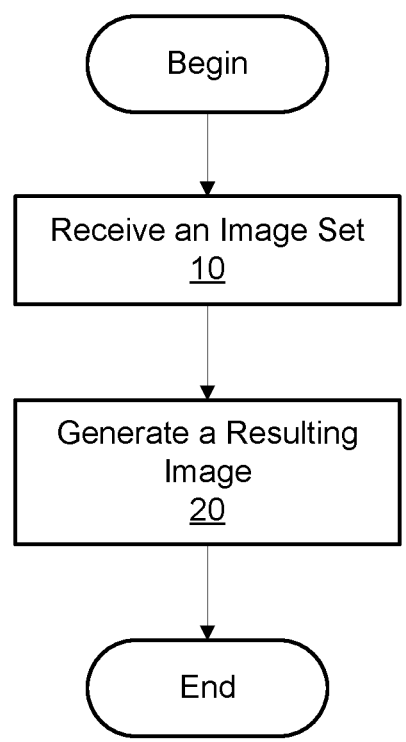
FIG. 1A illustrates a flow chart of a method for generating a resulting image from an image set comprising two or more images sampled under ambient illumination and/or strobe illumination, in accordance with one embodiment.

Embodiments of the present invention enable a digital photographic system to generate a digital image (or simply "image") of a photographic scene subjected to strobe illumination. Exemplary digital photographic systems include, without limitation, digital cameras and mobile devices such as smart phones that are configured to include a digital camera module and a strobe unit. A given photographic scene is a portion of an overall scene sampled by the digital photographic system.

Two or more images are sequentially sampled by the digital photographic system to generate an image set. Each image within the image set is generated in conjunction with different strobe intensity, different exposure parameters, or a combination thereof. Exposure parameters may include sensor sensitivity ("ISO" parameter), exposure time (shutter speed), aperture size (f-stop), and focus distance. In certain embodiments, one or more exposure parameters, such as aperture size, may be constant and not subject to determination. For example, aperture size may be constant based on a given lens design associated with the digital photographic system. At least two of the images comprising the image set are sampled in conjunction with a strobe unit, such as a light-emitting diode (LED) strobe unit, configured to contribute illumination to the photographic scene.

In one embodiment, exposure parameters are initially determined and held constant for each image in the image set. The exposure parameters may be initially determined based on ambient lighting conditions. If insufficient ambient lighting is available, such as for extremely dark scenes, then exposure parameters may be determined based on a mid-range strobe intensity. For example, mid-range strobe intensity may be selected as fifty-percent of a maximum strobe intensity for the strobe unit. The strobe unit is configured to modulate strobe intensity to provide a range of illumination contribution among the images within the image set. For example, the image set may comprise ten images, each with monotonically increasing illumination from the strobe unit. The first of ten images within the image set may be relatively under-exposed with respect to strobe illumination, while the tenth image may be over-exposed with respect to strobe illumination. However, one or more images between the first image and the tenth image will likely be appropriately-exposed with respect to strobe illumination. An image with appropriate illumination may be selected automatically or manually selected by a user. The image with appropriate illumination is then a resulting image for the photographic scene.

In another embodiment, images within the image set are sampled according to varying exposure parameters while the strobe unit is enabled to illuminate the photographic scene. One or more of the exposure parameters may be varied among sequential images comprising the image set. For example, exposure time may be increased (or decreased) among sequential images within the image set. Alternatively, sensor sensitivity may be increased (or decreased) among sequential images within the image set. Furthermore, two or more of the exposure parameters may be varied together among sequential images comprising the image set. For example, exposure time may be decreased while sensor sensitivity is increased. The net effect may preserve overall exposure, while decreasing blur as strobe intensity increases and exposure time decreases. As strobe intensity increases, sensor sensitivity may be increased. Because subject illumination in the photographic scene increases as the strobe intensity increases, increasing sensor sensitivity in sequential images will not likely introduce substantial additional image noise.

Sequential images may be sampled rapidly relative to motion and changes within the photographic scene. For example, the sequential images may be sampled at a rate of at least five sampled per second. In high performance systems, the images may be sampled at greater than fifty samples per second. With an inter-image time of less than two-hundred milliseconds, each image within the image set will depict substantially identical subject matter in common photographic scenarios. In one embodiment, the strobe unit is configured to modulate strobe intensity in time-synchronization with respect to image sampling. For example, the strobe unit may be configured to maintain a specified first strobe intensity during an exposure time for a first image in the image set and maintain a second strobe intensity during an exposure time of a second image in the image set. A transition from the first strobe intensity to the second strobe intensity is synchronized in time with completion of sampling the first image and initiating sampling of the second image.

In one embodiment, an image is selected from the image set based on exposure metrics generated for each image within the image set. In another embodiment, an image is selected by a user. An image may be recommended to the user based on the exposure metrics, but the user may select a different image based on individual choice. The user may view each image in the image set and select the image through a viewer system, configured to present the image set as a sequence of images that may be browsed using a continuous position control, such as a slider control.

FIG. 1A illustrates a flow chart of a method 1 for generating a resulting image from an image set comprising two or more images sampled under ambient illumination and/or strobe illumination, in accordance with one embodiment. Although method 1 is described in conjunction with the systems of FIGS. 2A-3B, persons of ordinary skill in the art will understand that any system that performs method 1 is within the scope and spirit of embodiments of the present invention. In one embodiment, a digital photographic system, such as digital photographic system 300 of FIG. 3A, is configured to perform method 1. The digital photographic system 300 may be implemented within a digital camera, such as digital camera 202 of FIG. 2A, or a mobile device, such as mobile device 204 of FIG. 2B.

Method 1 begins at step 10, where the digital photographic system receives an image set. The image set may include a plurality of images including at least a first image and a second image. In one embodiment, the first image may be captured by the digital photographic system based on a first set of sampling parameters, and the second image may be captured by the digital photographic system based on a second set of sampling parameters. The set of sampling parameters may include, but is not limited to, a shutter speed, an aperture setting, a strobe setting (i.e., a flash setting), a strobe intensity, an image sensor sensitivity (e.g., ISO setting), and the like. The images in the image set may include one or more images captured with ambient light (i.e., without a flash) and/or one or more images captured with strobe illumination (i.e., with a flash).

At step 20, a resulting image is generated based on the first image and the second image according to depth values in a selection depth map. Each distinct depth value in the selection depth map corresponds to a different image in the image set. For example, a first image captured with ambient light may correspond to a minimum value (e.g., distinct value of 0) in the selection depth map. A second image captured with strobe illumination may correspond to a higher value (e.g., distinct value of 1) in the selection depth map. Each different image may be assigned to a distinct depth. Additional images captured with strobe illumination may correspond to even higher distinct values in the selection depth map and so forth. The image set may consist entirely of images captured with ambient illumination (e.g., images captured without flash but with increasing exposure time/decreasing shutter speed, etc.), entirely of images captured with strobe illumination (e.g., images captured with increasing strobe intensity, etc.), or some combination of the two. Exemplary image sets may include tens or hundreds of images. Other image sets may include just two images, or more than two images.

As used herein, images captured with ambient illumination may comprise images captured while a strobe unit is disabled. In contrast, images captured with strobe illumination may comprise images captured while a strobe unit is enabled for at least a portion of the exposure time period such that the captured image data includes color information that includes light from the strobe unit reflected off at least one object in the photographic scene.

In one embodiment, the selection depth map includes a two-dimensional (2D) array of depth values and a location of a particular depth value in the 2D array corresponds to a particular pixel in the resulting image. In other words, the selection depth map may include an array having the same number of elements as the resolution of the images in the image set. The array may have a number of rows equal to the vertical resolution of the images in the image set and a number of columns equal to the horizontal resolution of the images in the image set. Alternatively, the array may have fewer elements than the resolution of each image in the image set and a particular depth value for a pixel in the resulting image is interpolated from elements of the array. For example a particular depth value may be calculated using a bilinear interpolation of array elements.

In another embodiment, the resulting image may be displayed in a user interface associated with a viewer application. For example, a digital photographic system may include an LCD display and a viewer application configured to display a user interface on the LCD display. The viewer application may display a resulting image and enable a user to modify the selection depth map to blend a plurality of images in the image set to generate the resulting image. In one embodiment, the viewer application may detect user input associated with the user interface that indicates a selection path within the resulting image. For example, the user may use an input device such as a mouse or stylus to draw a selection path over the resulting image. Alternatively, if the display device includes a touch-sensitive interface, the user may use touch input or multi-touch input to draw the selection path over the resulting image. The selection path may comprise a set of points relative to the pixel locations of the resulting image. The set of points may be connected to determine a plurality of pixels that intersect with the selection path. The selection path may intersect the same pixel more than once and may cross itself based on the user input.

In one embodiment, a selection region is selected based on the selection path. For example, a surface that includes all points in the selection path may be selected as the selection region. The points may include all points covered by stroking a geometric shape, such as a circle, along the selection path. Further, in another embodiment, a source image in the set of images may be analyzed to find edges in the source image. Any technically feasible edge detection algorithm may be used to find edges in the source image. Once edges are detected in the source image, a surface that includes all points in the selection path may be selected as the selection region, wherein the surface edges correspond to the predetermined edges in the source image. In one embodiment, a nearest edge is selected for each point in the selection path to generate a set of nearest edges in the source image. The set of nearest edges are then analyzed to determine a closed surface that includes all of the edges in the set of nearest edges, where the closed surface is then selected as the selection region. Alternatively, the closed surface may define a selection affinity boundary with a tapering region of influence.

Depth values in the selection depth map corresponding to the selection region are then adjusted based on the selection path. For example, in one embodiment, a depth value for a particular pixel is incremented each time the selection path overlaps with that pixel. In other words, as a user draws the selection path over the resulting image, the depth values in the selection depth map will be accumulated based on the intersection of the selection path with those pixels in the resulting image. In another embodiment, depth values in the selection depth map corresponding to the selection region based on a tapering region of influence around the selection path. In other words, a window function may increase (or decrease) depth values for pixels close to the selection path, but not intersected by the selection path, as well as pixels intersected by the selection path. The amount that a depth value is incremented (or decremented) may be based on the distance of that pixel from the selection path, with pixels closer to or intersected by the selection path being incremented by a greater amount than pixels further away from the selection path. Such adjusting of the selection depth map may be visualized similar to an airbrush tool in a Paint program. In such embodiments, the depth values may be incremented by fractional depth values that indicate a blend (e.g., alpha blend, etc.) between two source images in the image set. In one input mode, depth values are increased, while in another input mode, depth values are decreased.

Figure 1B:
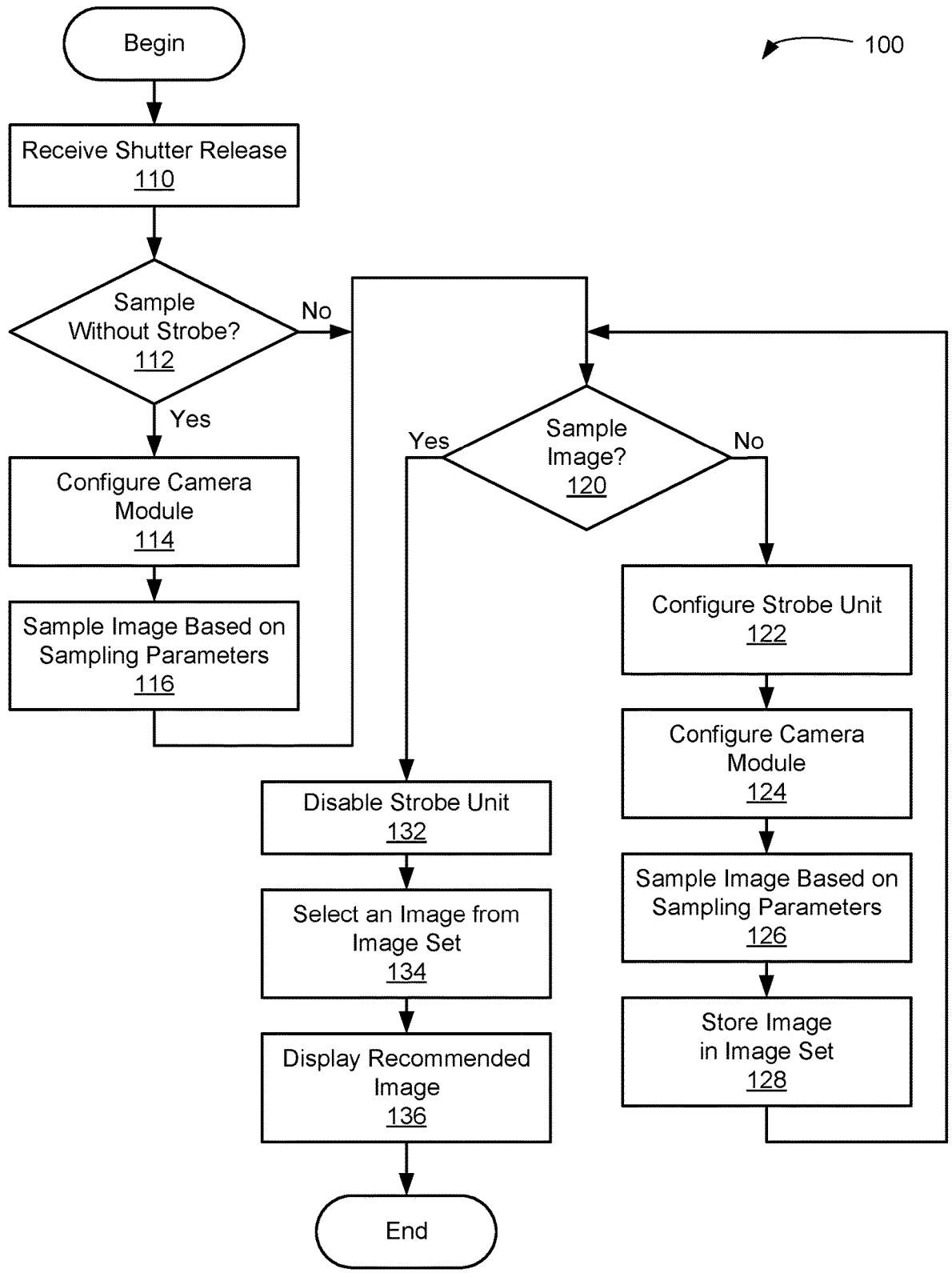
FIG. 1B illustrates a flow chart of a method for generating an image set comprising two or more images sampled under strobe illumination, in accordance with one embodiment.

FIG. 1B illustrates a flow chart of a method 100 for generating an image set comprising two or more images sampled under strobe illumination, in accordance with one embodiment. Although method 100 is described in conjunction with the systems of FIGS. 2A-3B, persons of ordinary skill in the art will understand that any system that performs method 100 is within the scope and spirit of embodiments of the present invention. In one embodiment, a digital photographic system, such as digital photographic system 300 of FIG. 3A, is configured to perform method 100. The digital photographic system 300 may be implemented within a digital camera, such as digital camera 202 of FIG. 2A, or a mobile device, such as mobile device 204 of FIG. 2B.

Method 100 begins in step 110, where the digital photographic system receives a shutter release command. The shutter release command may be generated explicitly by a user pressing a physical button or virtual button, or the shutter release command may be generated by a timer, motion sensor, voice control, remote control, or any other technically feasible mechanism.

If, in step 112, one or more images should be sampled without strobe illumination, then method 100 proceeds to step 114. In certain configurations, one or more images may be sampled without strobe illumination and added to the image set. An image sampled without strobe illumination is referred to herein as an ambient image. For certain photographic scenes, an ambient image may represent a better choice for a resulting image than other images within the image set sampled with strobe illumination. In certain implementations, whether to sample an ambient image is a design decision that applies to all image sets. In other implementations, a decision to sample an ambient image is made by a user and indicated through a user interface (UI) control. In still other implementations, a decision to sample an ambient image is made automatically based on photographic scene illumination conditions; for example, if the photographic scene is sufficiently dark, then no ambient image is sampled.

In step 114, the digital photographic system configures a camera module, such as camera module 330, to sample an ambient image according to ambient illumination conditions. Configuring the camera module may include determining exposure parameters for a current photographic scene and transmitting the exposure parameters to the camera module. In certain embodiments, the camera module determines exposure parameters for the photographic scene, such as in response to a command to meter a scene. Sampling parameters include the exposure parameters and strobe parameters, which include strobe intensity and may include strobe color. The strobe unit is disabled in this step and corresponding strobe parameters may be set to reflect that the strobe unit is disabled.

In step 116, the digital photographic system samples one or more ambient images based on the sampling parameters. In one embodiment, the one or more ambient images are sampled in conjunction with an exposure parameter sweep, such as an exposure time sweep. The one or more ambient images may be stored within the image set or combined to generate one or more high-dynamic range (HDR) images, which may be stored within the image set. In certain embodiments, the one or more HDR images are stored within the image set, but the one or more ambient images are not.

Returning to step 112, if one or more images should not be sampled without strobe illumination, then the method 100 proceeds to step 120.

If, in step 120, an image should be sampled, then the method 100 proceeds to step 122. A given image set should comprise at least two images sampled with strobe illumination. An image should be sampled if another image is needed to complete a given image set. In one embodiment, the image set comprises a fixed number of images, and another image should be sampled until the fixed number of images has been sampled. In other embodiments, the image set comprises a variable number of images, the number of images being determined adaptively based on exposure of sampled images comprising the image set. For example, the number of images may continue to increase, up to a maximum number of images, until an image having proper exposure is sampled in conjunction with varying the sampling parameters. Once the image having proper exposure is sampled, another image need not be sampled.

In step 122, the digital photographic system configures the strobe unit based on strobe parameters. Configuring the strobe unit may include enabling the strobe unit to generate illumination according to the strobe parameters. The strobe parameters specify a strobe intensity function that defines strobe intensity as a function corresponding to the images within the image set. In one embodiment, the strobe intensity function defines a predetermined strobe intensity for sequential images within the image set. In another embodiment, the strobe intensity function adaptively generates strobe intensity corresponding to a given image based on at least one previously sampled image or a previously determined exposure.

In certain embodiments, the strobe parameters specify a strobe illumination color, which may be specified as a ratio of red, green, and blue intensity, a color temperature, a color hue, or any other technically feasible color specification. When enabled, the strobe unit is configured to generate strobe illumination according to the specified strobe illumination color. In one embodiment, an ambient illumination color measurement is performed to determine which color to specify as a strobe illumination color. Any technically feasible technique may be implemented to perform the ambient illumination color measurement, including, without limitation, scene color averaging techniques, illuminator color detection techniques, and the like. Measurement data comprising image frames may be collected by a digital camera module. By causing the strobe unit to generate strobe illumination that is consistent in color with ambient illumination, subjects within the photographic scene that are substantially illuminated by the strobe illumination may appear to have proper and consistent color relative to other objects in the scene that are instead substantially illuminated by ambient illumination sources.

In step 124, the digital photographic system configures the camera module to be ready to sample an image according to exposure parameters, which may be determined once and applied to each image within the image set sampled with strobe illumination, or determined per image within the image set based on an exposure parameter function for the image set. Configuring the camera module may include writing registers within the camera module according to the exposure parameters.

The digital camera module includes an image sensor with a sensor sensitivity ranging from low-sensitivity (an ISO value of 100 or less) for generally bright photographic scenes to high-sensitivity (an ISO value of 1600 or more) for generally dark photographic scenes. Exposure time may range from one millisecond or less to more than a second. Determining exposure parameters typically comprises finding a combination of at least sensor sensitivity and exposure time that is estimated to be appropriate for a given intensity distribution, absolute overall scene brightness, or any combination thereof. The camera module may adaptively sample multiple image frames in finding the combination. As sensitivity is increased and/or exposure time is increased, image noise also increases. Image quality degradation due to noise typically establishes a combination of maximum exposure time and maximum sensitivity that should not be exceeded. If sufficient ambient illumination is not available, the digital camera module is unable to sample a usable image, and in some cases may simply generate a dark noise field. A certain implementation or design of a digital camera module may have better low-light performance than another implementation or design, and therefore a determination of whether sufficient ambient illumination is available is implementation-dependent.

In one embodiment, the exposure parameters are determined based on ambient illumination. Any technically feasible technique may be implemented to determine the exposure parameters. Persons skilled in the art will understand that such techniques are well-known in the art and, in certain scenarios, depend on a specific implementation of a digital photographic system.

In another embodiment, the exposure parameters are determined based on ambient illumination if sufficient ambient illumination is available or determined based on metering strobe illumination if sufficient ambient illumination is not available. The metering strobe illumination is provided by the strobe unit (or a similar unit), configured to provide mid-range strobe intensity while the exposure parameters are being determined. Alternatively, the strobe unit may be configured to provide a range of strobe intensity to provide a larger search space for determining exposure parameters. Any technically feasible technique may be implemented to determine whether sufficient ambient illumination is available, including, but not limited to, techniques that are associated with a particular implementation of a given digital camera module.

In step 126, the digital photographic system causes the digital camera module to sample an image based on current sampling parameters. In certain embodiments, a new set of sampling parameters may be determined based on the sampled image to be applied to sampling a subsequent image. For example, if the sampled image is under exposed, the new set of sampling parameters may provide for increased exposure time or an increased ISO value.

In step 128, the digital photographic system stores the image in the image set. The image set may be stored within NV memory 316, volatile memory 318, or the image set may be stored to a remote storage system, such as through wireless unit 340. Each image within the image set may be referred to herein as a source image.

Returning to step 120, if the last image for the image set has been sampled, then the method 100 proceeds to step 132, where the digital photographic system disables the strobe unit. In step 134, the digital photographic system evaluates images comprising the image set to select a recommended image from the image set having appropriate exposure. In one embodiment, step 134 comprises method 102 of FIG. 1C. In step 136, the digital photographic system displays the recommended image. As discussed below in FIGS. 5A through 5C, a user may select a different image within the image set than the recommended image.

Figure 1C:
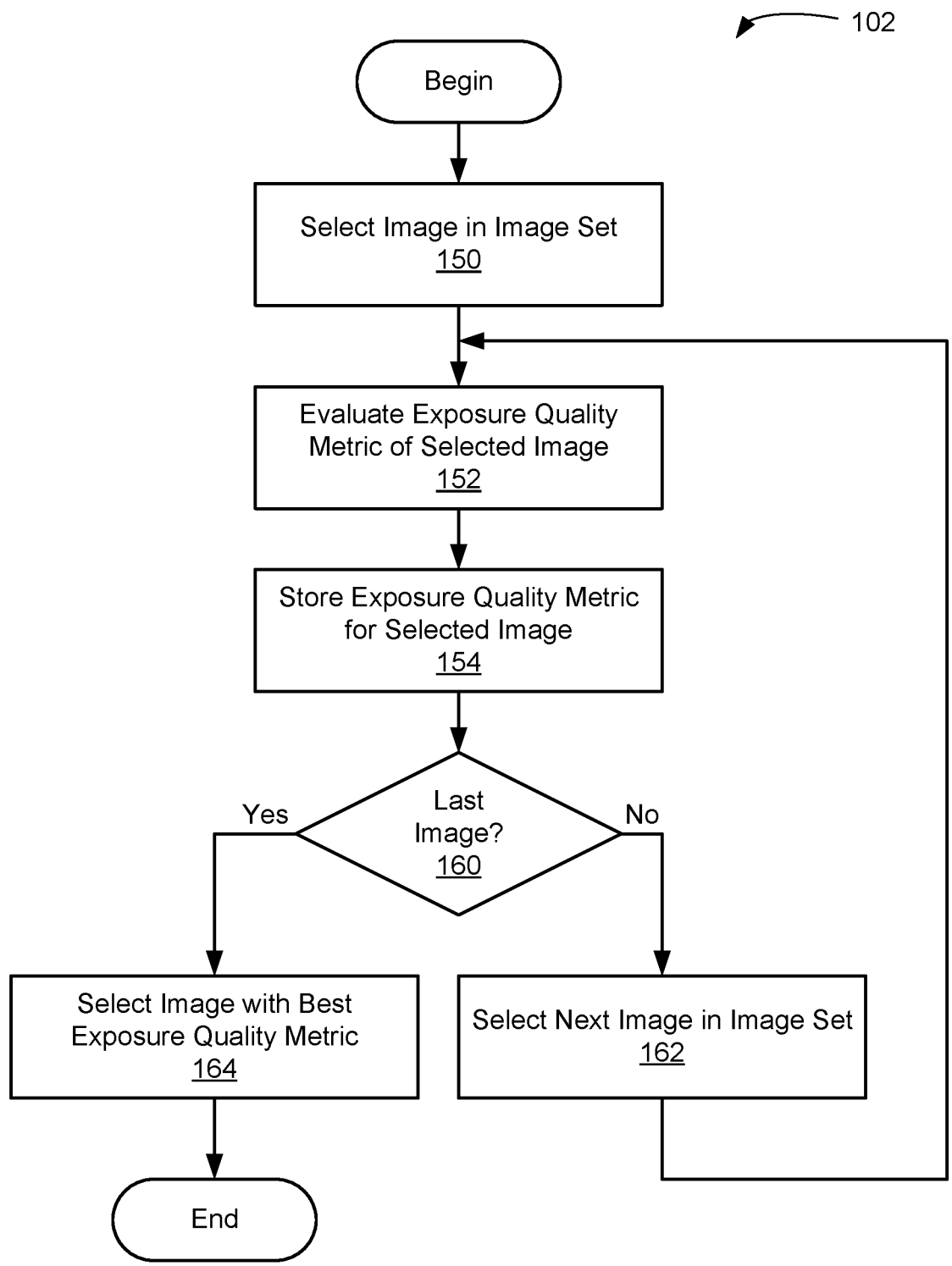
FIG. 1C illustrates a flow chart of a method for selecting one image from an image set based on exposure quality, in accordance with one embodiment.

In an alternative embodiment, an exposure quality metric, described below in FIG. 1C, is evaluated and stored in step 128 for a corresponding image sampled in step 126. In step 134, a recommended image is selected from the image set based on at least one exposure quality metric associated with each image in the image set. For example, if the exposure quality metric is defined to be a cost function that assigns an increasing cost penalty to increasingly undesirable exposures, then the recommended image is selected to have the lowest corresponding cost penalty (exposure quality metric) among the images in the image set.

FIG. 1C illustrates a flow chart of a method 102 for selecting one image from an image set based on exposure quality, in accordance with one embodiment. Although method 102 is described in conjunction with the systems of FIGS. 2A-3B, persons of ordinary skill in the art will understand that any system that performs method 102 is within the scope and spirit of embodiments of the present invention. In one embodiment, a digital photographic system, such as digital photographic system 300 of FIG. 3A, is configured to perform method 102. The digital photographic system may be implemented within a digital camera, such as digital camera 202 of FIG. 2A, or a mobile device, such as mobile device 204 of FIG. 2B.

Method 102 begins in step 150, where the digital photographic system selects an image in the image set of FIG. 1C. In one embodiment, the image set is organized as an ordered sequence of images, and the selected image comprises a first image of the ordered sequence of images. In step 152, the digital photographic system evaluates exposure quality of the selected image. In one embodiment, a cost function that assigns a high cost penalty to over-exposed pixels within the selected image may be implemented to evaluate an exposure quality metric. The cost function may assign a constant cost penalty to each over-exposed pixel or a progressively increasing cost function based on a count for over-exposed pixels within the selected image. Any other technically feasible technique for evaluating an exposure quality metric may also be implemented without departing the scope and spirit of the present invention.

In step 154, the digital photographic system stores the exposure quality metric associated with the selected image. If, in step 160, the selected image is not the last image within the image set to be selected and evaluated, then the method proceeds to step 162, where the digital photographic system selects a next image in the image set before proceeding back to step 152.

Returning to step 160, if the selected image is the last image within the image set to be selected and evaluated, then the method proceeds to step 164, where the digital photographic system selects an image within the image set having the best exposure quality metric. For example, if the exposure quality metric is defined to be a cost function configured to assign an increasingly higher cost to increasingly undesirable exposures, then an image is selected to have the lowest corresponding cost (exposure quality metric) among the images in the image set. The selected image in this step may comprise a recommended image.

Figure 2A:
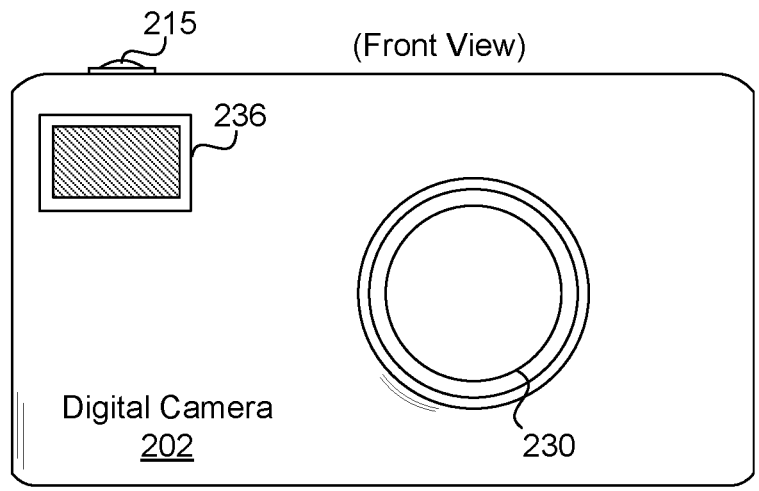
FIG. 2A illustrates a digital camera, configured to implement one or more aspects of the present invention.
Figure 3A:
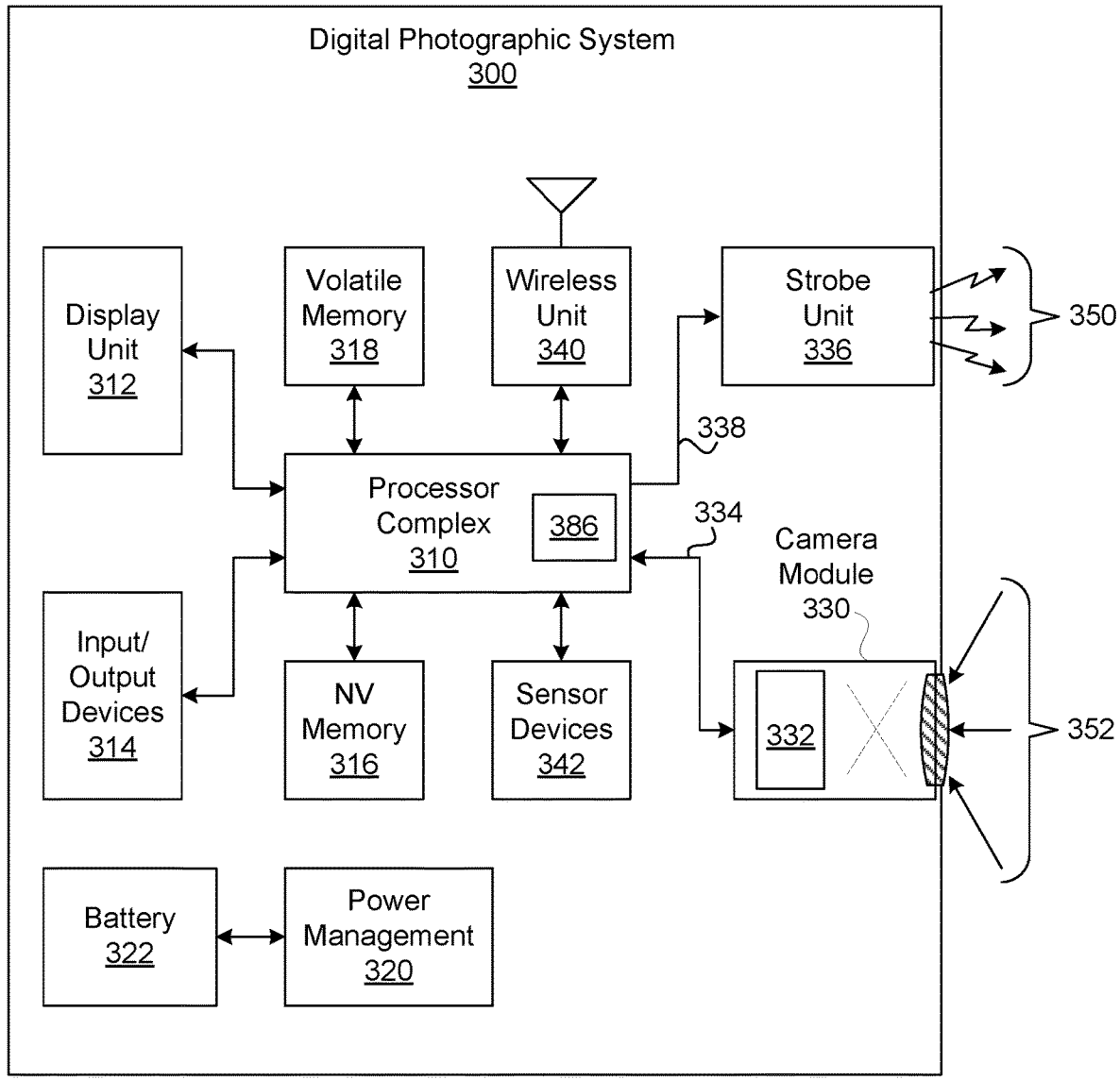
FIG. 3A illustrates a digital photographic system, configured to implement one or more aspects of the present invention.

FIG. 2A illustrates a digital camera 202, configured to implement one or more aspects of the present invention. Digital camera 202 includes a digital photographic system, such as digital photographic system 300 of FIG. 3A, configured to generate an image set by sampling a photographic scene as described in conjunction with method 100 of FIG. 1B. A digital camera unit within the digital photographic system is coupled to a lens 230, through which each image comprising the image set is sampled.

Digital camera 202 includes a strobe unit 236, and may include a shutter release button 215 for triggering a photographic sample event, whereby digital camera 202 samples two or more images comprising an image set. Any other technically feasible shutter release command may trigger the photographic sample event, such as a timer trigger or remote control receiver configured to generate a shutter release command. Embodiments of the present invention advantageously enable a user to photograph a scene using a single shutter release command, and subsequently select an image sampled according to a strobe intensity that best satisfies user aesthetic requirements for the photographic scene. In contrast, a conventional digital camera typically samples a single image illuminated by strobe illumination per shutter release trigger, commonly forcing the user to either manually photograph the photographic scene multiple times, or to suffer poor image quality resulting over-exposure or under-exposure.

Figure 2B:
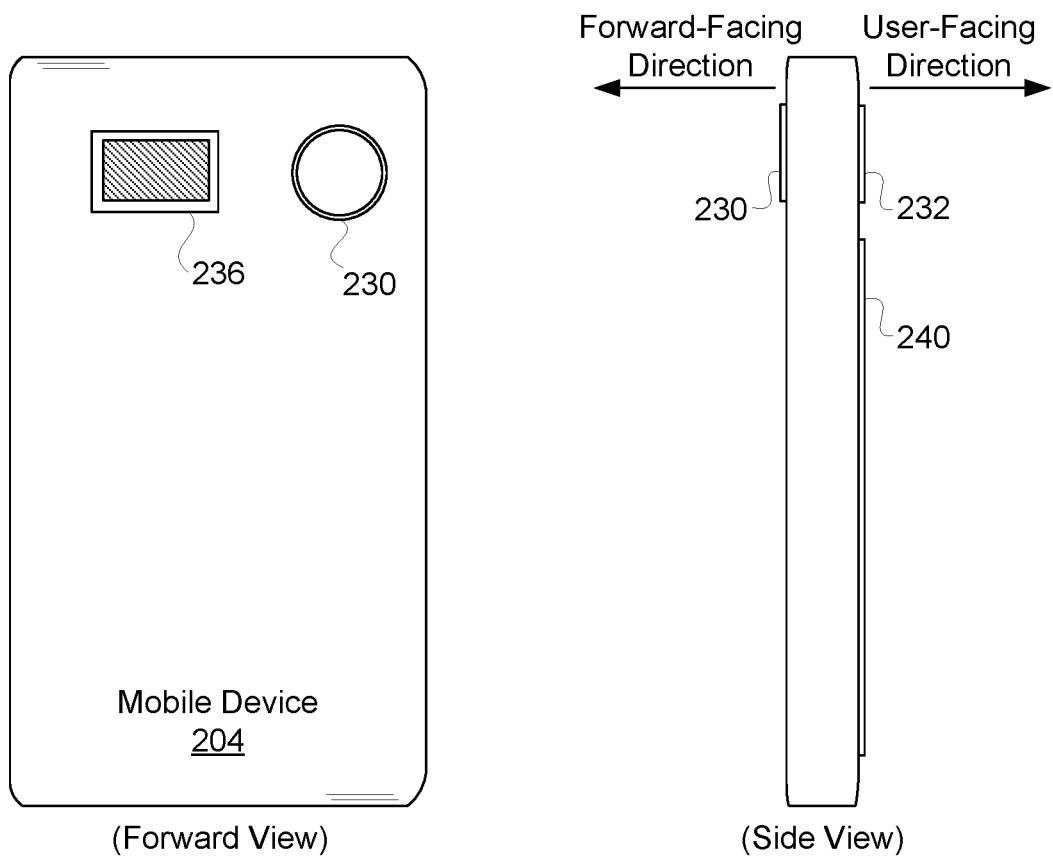
FIG. 2B illustrates a mobile device, configured to implement one or more aspects of the present invention.

FIG. 2B illustrates a mobile device 204, configured to implement one or more aspects of the present invention. Mobile device 204 includes a digital photographic system, such as digital photographic system 300 of FIG. 3A, configured to generate an image set by sampling a scene as described in conjunction with method 100 of FIG. 1B. A shutter release command may be generated through a mechanical button or a virtual button, which may be activated by a touch gesture on a touch entry display system 240 within mobile device 204.

In one embodiment, the touch entry display system 240 is disposed on the opposite side of mobile device 204 relative to the lens 230. In certain embodiments, the mobile device 204 includes a user-facing digital camera coupled to lens 232 and a user-facing strobe unit. The user-facing digital camera and user-facing strobe unit are configured to sample an image set in accordance with method 100 of FIG. 1B.

FIG. 3A illustrates a digital photographic system 300, configured to implement one or more aspects of the present invention. Digital photographic system 300 includes a processor complex 310 coupled to a camera module 330 and a strobe unit 336. Digital photographic system 300 may also include, without limitation, a display unit 312, a set of input/output devices 314, non-volatile memory 316, volatile memory 318, a wireless unit 340, and sensor devices 342, each coupled to processor complex 310. In one embodiment, a power management subsystem 320 is configured to generate appropriate power supply voltages for each electrical load element within digital photographic system 300. A battery 322 may be configured to supply electrical energy to power management subsystem 320. Battery 322 may implement any technically feasible energy storage system, including primary or rechargeable battery technologies. In one embodiment, lens 230 of FIGS. 2A and 2B is coupled to camera module 330, and strobe unit 236 comprises strobe unit 336.

In one embodiment, strobe unit 336 is integrated into digital photographic system 300 and configured to provide strobe illumination 350 during an image sample event performed by digital photographic system 300. In an alternative embodiment, strobe unit 336 is implemented as an independent device from digital photographic system 300 and configured to provide strobe illumination 350 during an image sample event performed by digital photographic system 300. Strobe unit 336 may comprise one or more LED devices. In certain embodiments, two or more strobe units are configured to synchronously generate strobe illumination in conjunction with sampling an image.

In one embodiment, strobe unit 336 is directed through a strobe control signal 338 to either emit strobe illumination 350 or not emit strobe illumination 350. The strobe control signal 338 may implement any technically feasible signal transmission protocol. Strobe control signal 338 may indicate a strobe parameter, such as strobe intensity or strobe color, for directing strobe unit 336 to generate a specified intensity and/or color of strobe illumination 350. As shown, strobe control signal 338 may be generated by processor complex 310. Alternatively, strobe control signal 338 may be generated by camera module 330 or by any other technically feasible system element.

In one usage scenario, strobe illumination 350 comprises at least a portion of overall illumination in a photographic scene being photographed by camera module 330. Optical scene information 352, which may include strobe illumination 350 reflected from objects in the photographic scene, is focused as an optical image onto an image sensor 332, within camera module 330. Image sensor 332 generates an electronic representation of the optical image. The electronic representation comprises spatial color intensity information, which may include different color intensity samples, such as for red, green, and blue light. The spatial color intensity information may also include samples for white light. Alternatively, the color intensity samples may include spatial color intensity information for cyan, magenta, and yellow light. Persons skilled in the art will recognize that other and further sets of spatial color intensity information may be implemented. The electronic representation is transmitted to processor complex 310 via interconnect 334, which may implement any technically feasible signal transmission protocol.

Input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, input/output devices 314 include a capacitive touch input surface coupled to display unit 312.

Non-volatile (NV) memory 316 is configured to store data when power is interrupted. In one embodiment, NV memory 316 comprises one or more flash memory devices. NV memory 316 may be configured to include programming instructions for execution by one or more processing units within processor complex 310. The programming instructions may implement, without limitation, an operating system (OS), UI modules, image processing and storage modules, one or more modules for sampling an image set through camera module 330, one or more modules for presenting the image set through display unit 312. The programming instructions may also implement one or more modules for merging images or portions of images within the image set, aligning at least portions of each image within the image set, or a combination thereof. One or more memory devices comprising NV memory 316 may be packaged as a module configured to be installed or removed by a user. In one embodiment, volatile memory 318 comprises dynamic random access memory (DRAM) configured to temporarily store programming instructions, image data such as data associated with an image set, and the like, accessed during the course of normal operation of digital photographic system 300.

Sensor devices 342 may include, without limitation, an accelerometer to detect motion and/or orientation, an electronic gyroscope to detect motion and/or orientation, a magnetic flux detector to detect orientation, a global positioning system (GPS) module to detect geographic position, or any combination thereof.

Wireless unit 340 may include one or more digital radios configured to send and receive digital data. In particular, wireless unit 340 may implement wireless standards known in the art as "WiFi" based on Institute for Electrical and Electronics Engineers (IEEE) standard 802.11, and may implement digital cellular telephony standards for data communication such as the well-known "3G" and "4G" suites of standards. Wireless unit 340 may further implement standards and protocols known in the art as LTE (long term evolution). In one embodiment, digital photographic system 300 is configured to transmit one or more digital photographs, sampled according to techniques taught herein, to an online or "cloud-based" photographic media service via wireless unit 340. The one or more digital photographs may reside within either NV memory 316 or volatile memory 318. In such a scenario, a user may possess credentials to access the online photographic media service and to transmit the one or more digital photographs for storage and presentation by the online photographic media service. The credentials may be stored or generated within digital photographic system 300 prior to transmission of the digital photographs. The online photographic media service may comprise a social networking service, photograph sharing service, or any other network-based service that provides storage and transmission of digital photographs. In certain embodiments, one or more digital photographs are generated by the online photographic media service based on an image set sampled according to techniques taught herein. In such embodiments, a user may upload source images comprising an image set for processing by the online photographic media service.

In one embodiment, digital photographic system 300 comprises a plurality of camera modules 330. Such an embodiment also includes at least one strobe unit 336 configured to illuminate a photographic scene, sampled as multiple views by the plurality of camera modules 330. The plurality of camera modules 330 may be configured to sample a wide angle view (greater than forty-five degrees of sweep among cameras) to generate a panoramic photograph. The plurality of camera modules 330 may also be configured to sample two or more narrow angle views (less than forty-five degrees of sweep among cameras) to generate a stereoscopic photograph.

Display unit 312 is configured to display a two-dimensional array of pixels to form an image for display. Display unit 312 may comprise a liquid-crystal display, an organic LED display, or any other technically feasible type of display. In certain embodiments, display unit 312 is able to display a narrower dynamic range of image intensity values than a complete range of intensity values sampled over a set of two or more images comprising the image set. Here, images comprising the image set may be merged according to any technically feasible HDR blending technique to generate a synthetic image for display within dynamic range constraints of display unit 312. In one embodiment, the limited dynamic range specifies an eight-bit per color channel binary representation of corresponding color intensities. In other embodiments, the limited dynamic range specifies a twelve-bit per color channel binary representation.

Figure 3B:
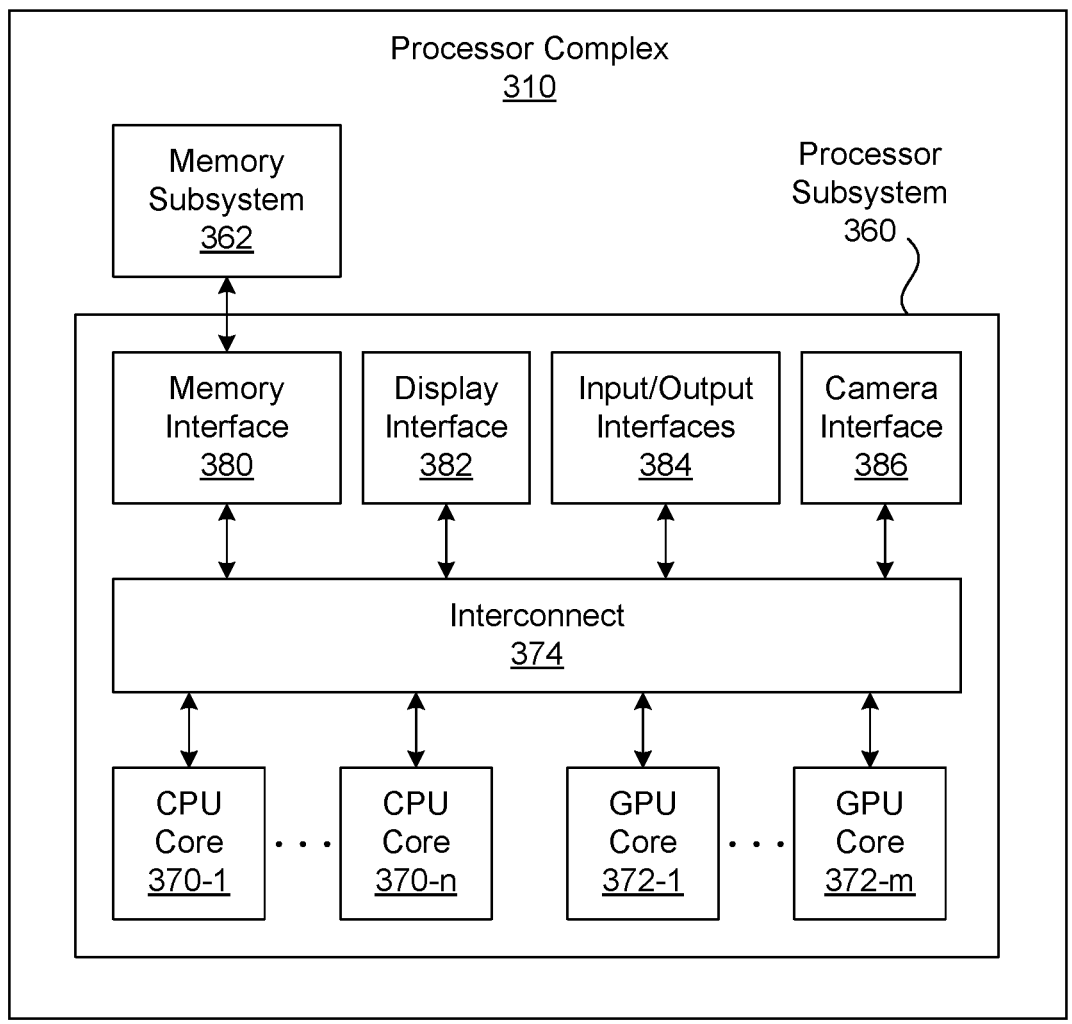
FIG. 3B illustrates a processor complex within the digital photographic system, in accordance with one embodiment.

FIG. 3B illustrates a processor complex 310 within digital photographic system 300 of FIG. 3A, according to one embodiment of the present invention. Processor complex 310 includes a processor subsystem 360 and may include a memory subsystem 362. In one embodiment, processor complex 310 comprises a system on a chip (SoC) device that implements processor subsystem 360, and memory subsystem 362 comprising one or more DRAM devices coupled to processor subsystem 360. In one implementation of the embodiment, processor complex 310 comprises a multi-chip module (MCM) encapsulating the SoC device and the one or more DRAM devices.

Processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within memory subsystem 362, volatile memory 318, NV memory 316, or any combination thereof. Each of the one or more CPU cores 370 may be configured to retrieve and store data via interconnect 374 and memory interface 380. Each of the one or more CPU cores 370 may include a data cache, and an instruction cache. Two or more CPU cores 370 may share a data cache, an instruction cache, or any combination thereof. In one embodiment, a cache hierarchy is implemented to provide each CPU core 370 with a private cache layer, and a shared cache layer.

Processor subsystem 360 may further include one or more graphics processing unit (GPU) cores 372. Each GPU core 372 comprises a plurality of multi-threaded execution units that may be programmed to implement graphics acceleration functions. GPU cores 372 may be configured to execute multiple thread programs according to well-known standards such as OpenGL™, OpenCL™, CUDA™, and the like. In certain embodiments, at least one GPU core 372 implements at least a portion of a motion estimation function, such as a well-known Harris detector or a well-known Hessian-Laplace detector. Such a motion estimation function may be used for aligning images or portions of images within the image set.

Interconnect 374 is configured to transmit data between and among memory interface 380, display interface unit 382, input/output interfaces unit 384, CPU cores 370, and GPU cores 372. Interconnect 374 may implement one or more buses, one or more rings, a cross-bar, a mesh, or any other technically feasible data transmission structure or technique. Memory interface 380 is configured to couple memory subsystem 362 to interconnect 374. Memory interface 380 may also couple NV memory 316, volatile memory 318, or any combination thereof to interconnect 374. Display interface unit 382 is configured to couple display unit 312 to interconnect 374. Display interface unit 382 may implement certain frame buffer functions such as frame refresh. Alternatively, display unit 312 may implement frame refresh. Input/output interfaces unit 384 is configured to couple various input/output devices to interconnect 374.

In certain embodiments, camera module 330 is configured to store exposure parameters for sampling each image in an image set. When directed to sample an image set, the camera module 330 samples the image set according to the stored exposure parameters. A software module executing within processor complex 310 may generate and store the exposure parameters prior to directing the camera module 330 to sample the image set.

In other embodiments, camera module 330 is configured to store exposure parameters for sampling an image in an image set, and the camera interface unit 386 within the processor complex 310 is configured to cause the camera module 330 to first store exposure parameters for a given image comprising the image set, and to subsequently sample the image. In one embodiment, exposure parameters associated with images comprising the image set are stored within a parameter data structure. The camera interface unit 386 is configured to read exposure parameters from the parameter data structure for a given image to be sampled, and to transmit the exposure parameters to the camera module 330 in preparation of sampling an image. After the camera module 330 is configured according to the exposure parameters, the camera interface unit 386 directs the camera module 330 to sample an image. Each image within an image set may be sampled in this way. The data structure may be stored within the camera interface unit 386, within a memory circuit within processor complex 310, within volatile memory 318, within NV memory 316, or within any other technically feasible memory circuit. A software module executing within processor complex 310 may generate and store the data structure.

In one embodiment, the camera interface unit 386 transmits exposure parameters and commands to camera module 330 through interconnect 334. In certain embodiments, the camera interface unit 386 is configured to directly control the strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In this context, synchronization applies to coordinating at least method steps 122, 124, and 126 of method 100. That is, synchronizing the steps of configuring the camera module 330 prior to sampling an image, configuring the strobe unit 336 to generate appropriate strobe illumination, and directing the camera module 330 to sample a photographic scene subjected to strobe illumination.

Additional set-up time or execution time associated with each step may reduce overall sampling performance. Therefore, a dedicated control circuit, such as the camera interface unit 386, may be implemented to substantially minimize set-up and execution time associated with each step and any intervening time between steps.

In other embodiments, a software module executing within processor complex 310 directs the operation and synchronization of camera module 330 and the strobe unit 336, with potentially reduced performance.

In one embodiment, camera interface unit 386 is configured to accumulate statistics while receiving image data from the camera module 330. In particular, the camera interface unit 386 may accumulate exposure statistics for a given image while receiving image data for the image through interconnect 334. Exposure statistics may include an intensity histogram, a count of over-exposed pixels, a counter of under-exposed pixels, an intensity-weighted sum of pixel intensity, or any combination thereof. The camera interface unit 386 may present the exposure statistics as memory-mapped storage locations within a physical or virtual address space defined by a processor, such as a CPU core 370, within processor complex 310.

In certain embodiments, camera interface unit 386 accumulates color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image. In one embodiment, camera interface unit 386 accumulates spatial color statistics for performing color-matching between or among images, such as between or among an ambient image and one or more images sampled with strobe illumination. As with the exposure statistics, the color statistics may be presented as memory-mapped storage locations within processor complex 310.

In one embodiment, camera module 330 transmits strobe control signal 338 to strobe unit 336, enabling strobe unit 336 to generate illumination while the camera module 330 is sampling an image. In another embodiment, camera module 330 samples an image illuminated by strobe unit 336 upon receiving an indication from camera interface unit 386 that strobe unit 336 is enabled. In yet another embodiment, camera module 330 samples an image illuminated by strobe unit 336 upon detecting strobe illumination within a photographic scene via a rapid rise in scene illumination.

Figure 4A:
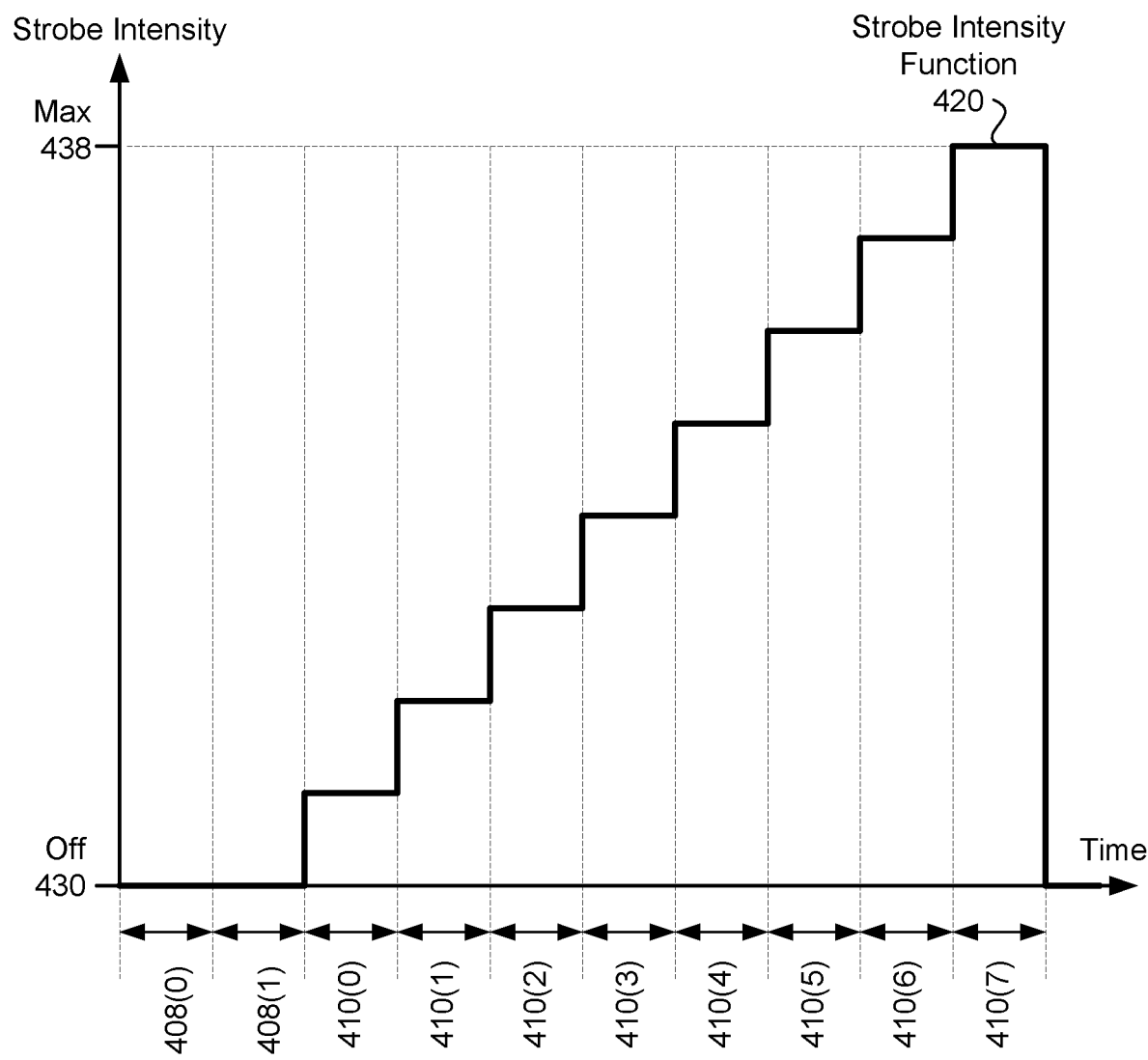
FIG. 4A illustrates a linear profile for a strobe intensity function associated with sampling an image set, in accordance with one embodiment.

FIG. 4A illustrates a linear profile for a strobe intensity function 420 associated with sampling an image set, in accordance with one embodiment. The strobe intensity function 420 represents average strobe intensity during an exposure time for an image sampled within a corresponding time interval 410. Strobe intensity may vary between off 430 and a maximum intensity 438. The maximum intensity 438 is a characteristic of a given implementation of a strobe unit, such as strobe unit 336 of FIG. 3A. Strobe intensity function 420 is depicted herein as scaled according to the maximum intensity 438.

As shown, the strobe intensity function 420 includes a set of increasing strobe intensity values up to and including maximum intensity 438. An image comprising the image set may be sampled during each time interval 410 under strobe illumination. An image, such as an ambient image, may also be sampled during a time interval 408 prior to time interval 410(0). In one embodiment, sequential images comprising the image set are sampled in sequential time intervals 410.

While each time interval 408, 410 is shown to be of substantially equal duration, each time interval 408, 410 may vary.

In one embodiment, steps 122, 124, 126, and 128 of method 100 are performed for each time interval 410. Steps 132, 134, and 136 may be performed subsequent to time interval 410(7), or more generally, subsequent to a final time interval for a given image set.

Figure 4B:
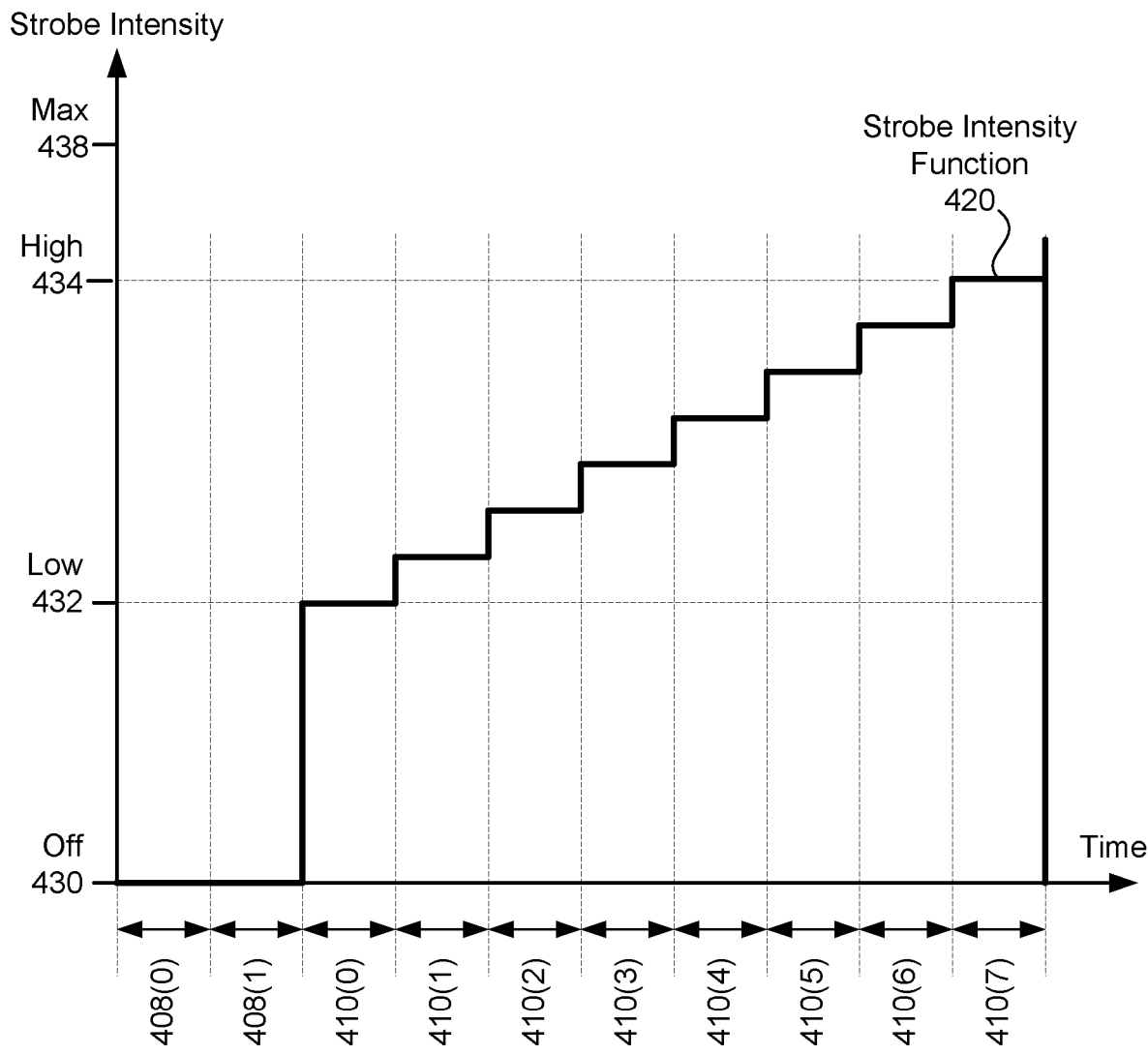
FIG. 4B illustrates a range-limited profile for a strobe intensity function associated with sampling an image set, in accordance with one embodiment.

FIG. 4B illustrates a range-limited profile for a strobe intensity function 420 associated with sampling an image set, in accordance with one embodiment. As shown, the range-limited profile modifies the strobe intensity function 420 relative to FIG. 4A by limiting the total range of strobe intensity between a low intensity value 432 and a high intensity value 434. By limiting the strobe intensity range, finer strobe intensity resolution within a range estimated to be appropriate for a given photographic scene may be available within images comprising the image set. The low intensity value 432 and the high intensity value 434 may be determined using any technically feasible technique, such as through a metering-strobe technique illustrated below in FIG. 4H. In certain operating modes, such as a portrait photographic mode, the high intensity value 434 is constrained based on ambient illumination within a photographic scene. Constraining the high intensity value 434 based on ambient illumination may avoid excessive strobe intensity, which may be unpleasant to persons being subjected to the strobe illumination. The low intensity value 432 may then be determined to provide an appropriate range of strobe intensity for images within the image set.

Figure 4C:
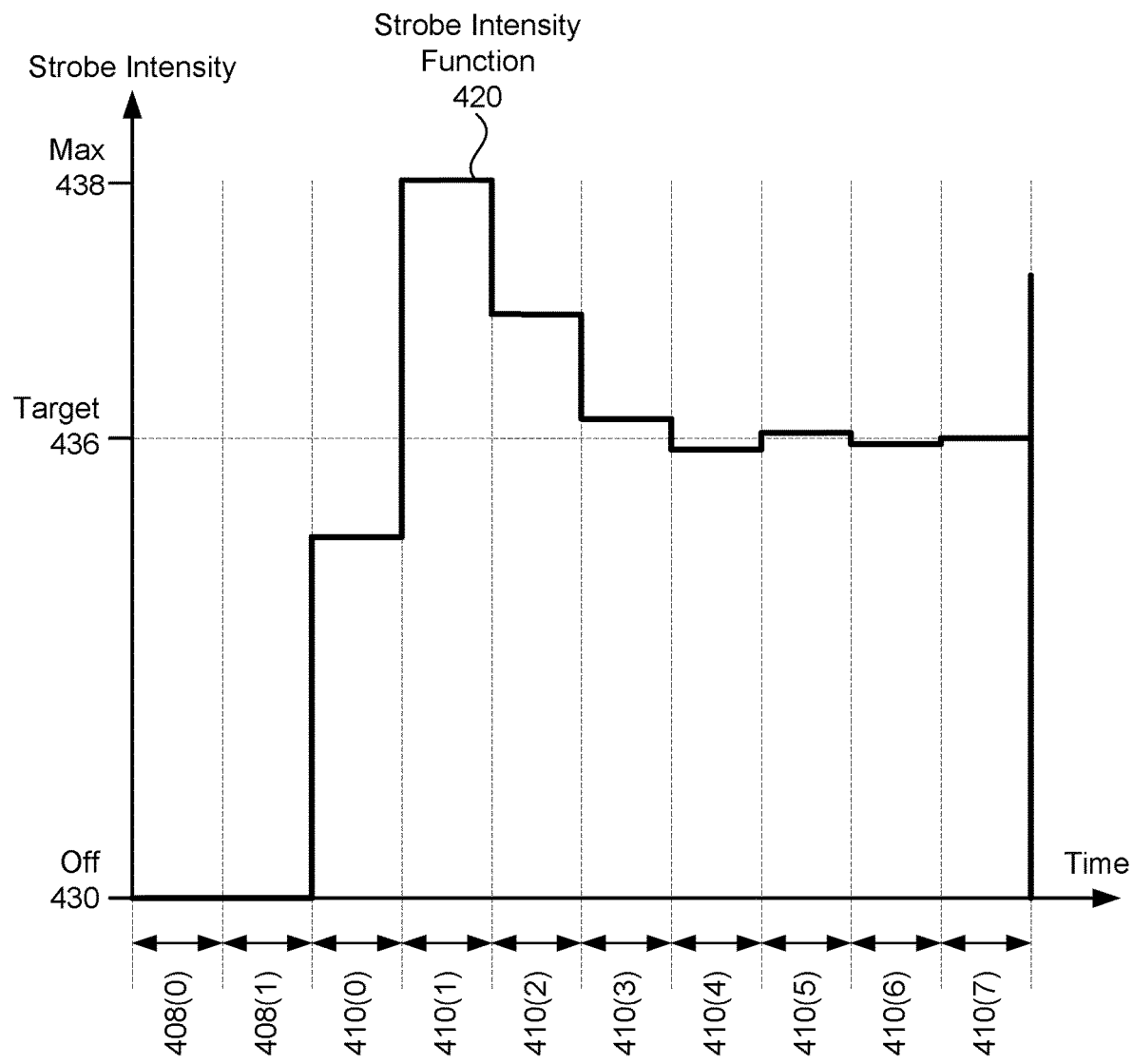
FIG. 4C illustrates an adaptive profile for a strobe intensity function associated with sampling an image set, in accordance with one embodiment.

FIG. 4C illustrates an adaptive profile for a strobe intensity function 420 associated with sampling an image set, in accordance with one embodiment. As shown, the adaptive profile modifies the strobe intensity function 420 relative to FIG. 4A by adaptively determining a subsequent strobe intensity value based on at least one previously sampled image. By adaptively determining a subsequent strobe intensity value for sequentially sampled images, a final image may be sampled having a target intensity value 436 that provides an estimated proper strobe exposure for the final image. In one embodiment, adaptively determining a subsequent strobe intensity value is performed during step 122 of method 100.

Estimating proper strobe exposure may be performed using any technically feasible techniques, including techniques that attempt to minimize over-exposed pixels while maximizing the strobe intensity. As shown, the strobe intensity function 420 represent an exemplary binary-style search performed to minimize over-exposed pixels in sequential time intervals 410 to converge on a target intensity value 436 that provides a minimum of over-exposed pixels while maximizing strobe intensity.

In certain embodiments, camera interface unit 386 is configured to generate exposure statistics, which are analyzed to adaptively determine a subsequent strobe intensity. For example, strobe intensity function 420 may follow a binary search profile, with strobe intensity modulated based on a count of over-exposed pixels and/or under-exposed pixels. Alternatively, the strobe intensity may be modulated according to the binary search profile based on an intensity histogram, which indicates general over-exposure, general under-exposure, and median intensity.

In one embodiment, images comprising the image set are ordered sequentially in sorted order according to strobe intensity. The images within the image set may then be viewed according to a monotonic strobe intensity, which may provide a more intuitive depiction of the strobe intensity range. Any technically feasible technique may be implemented to order the images according to monotonic strobe intensity. For example, image order within the image set may be represented as a sorted list of strobe intensity, whereby each element of the sorted list includes a reference to a corresponding image. Sequentially referencing images within the image set may therefore be performed by sequentially accessing images referred to by list elements. In one embodiment, certain images that are excessively over-exposed or under-exposed may be discarded from the image set. In general, images within a given image set may be ordered according to a monotonic parameter sequence, such as an increasing strobe intensity sequence, regardless of a particular profile for strobe intensity function 420.

Figure 4D:
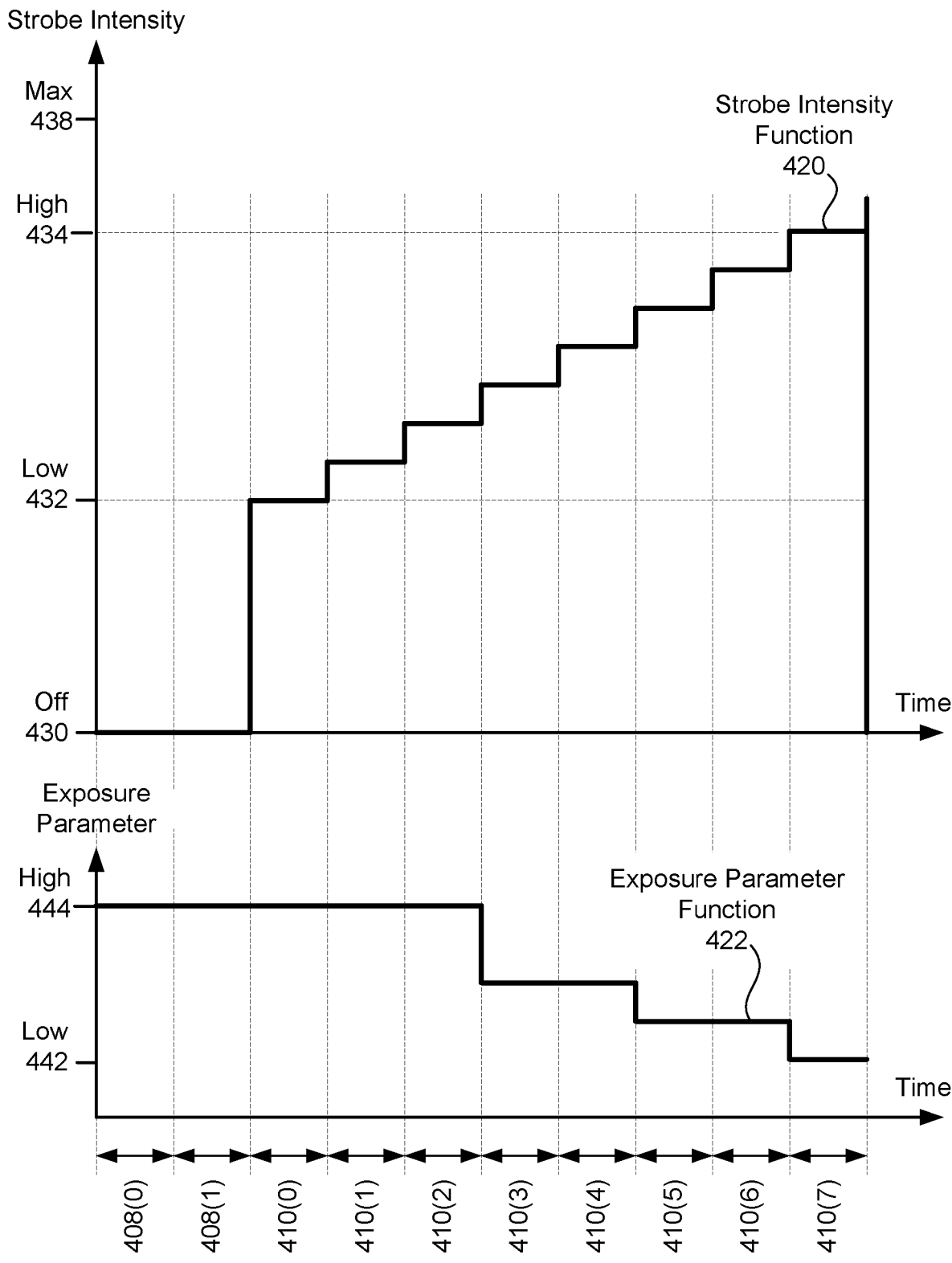
FIG. 4D illustrates a range-limited profile for a strobe intensity function and a monotonic profile for an exposure parameter function associated with sampling a set of digital photographs, in accordance with one embodiment.

FIG. 4D illustrates a range-limited profile for a strobe intensity function 420 and a monotonic profile for an exposure parameter function 422 associated with sampling a set of digital photographs, in accordance with one embodiment. As shown, the range-limited profile for strobe intensity function 420 of FIG. 4B is executed in conjunction with exposure parameter function 422. The exposure parameter function 422 may represent any exposure parameter over time intervals 408 and 410. In one embodiment, the exposure parameter function 422 specifies exposure time varying between a high value 444 (longer exposure) to a low value 442 (shorter exposure).

The high value 444 and the low value 442 may each be selected using any technically feasible technique. In one embodiment, the high value 444 is selected to over-expose an ambient photographic scene, metered during time interval 408(0), by a predetermined amount. For example, the high value 444 may be selected over-expose the ambient photographic scene by one conventional photographic exposure stop. Similarly, the low value 442 may be selected to under-expose the ambient photographic scene by a predetermined amount, such as one conventional photographic exposure stop. Regions within the photographic scene predominantly illuminated by ambient illumination will be over-exposed in time interval 410(0), under-exposed in time interval 410(7), and properly-exposed mid-way between time intervals 410(0) and 410(7). Sequential images within the image set corresponding to time intervals 410(0) through 410(7) will advantageously provide a range of exposure variation for both ambient-illuminated regions and strobe-illuminated regions.

In certain embodiments, two exposure parameters may be varied together in sequential time intervals. For example, exposure time may be reduced, while increasing sensor sensitivity to provide a trade-off between sensor image noise and blur due to motion in sequential images comprising the image set.

Figure 4E:
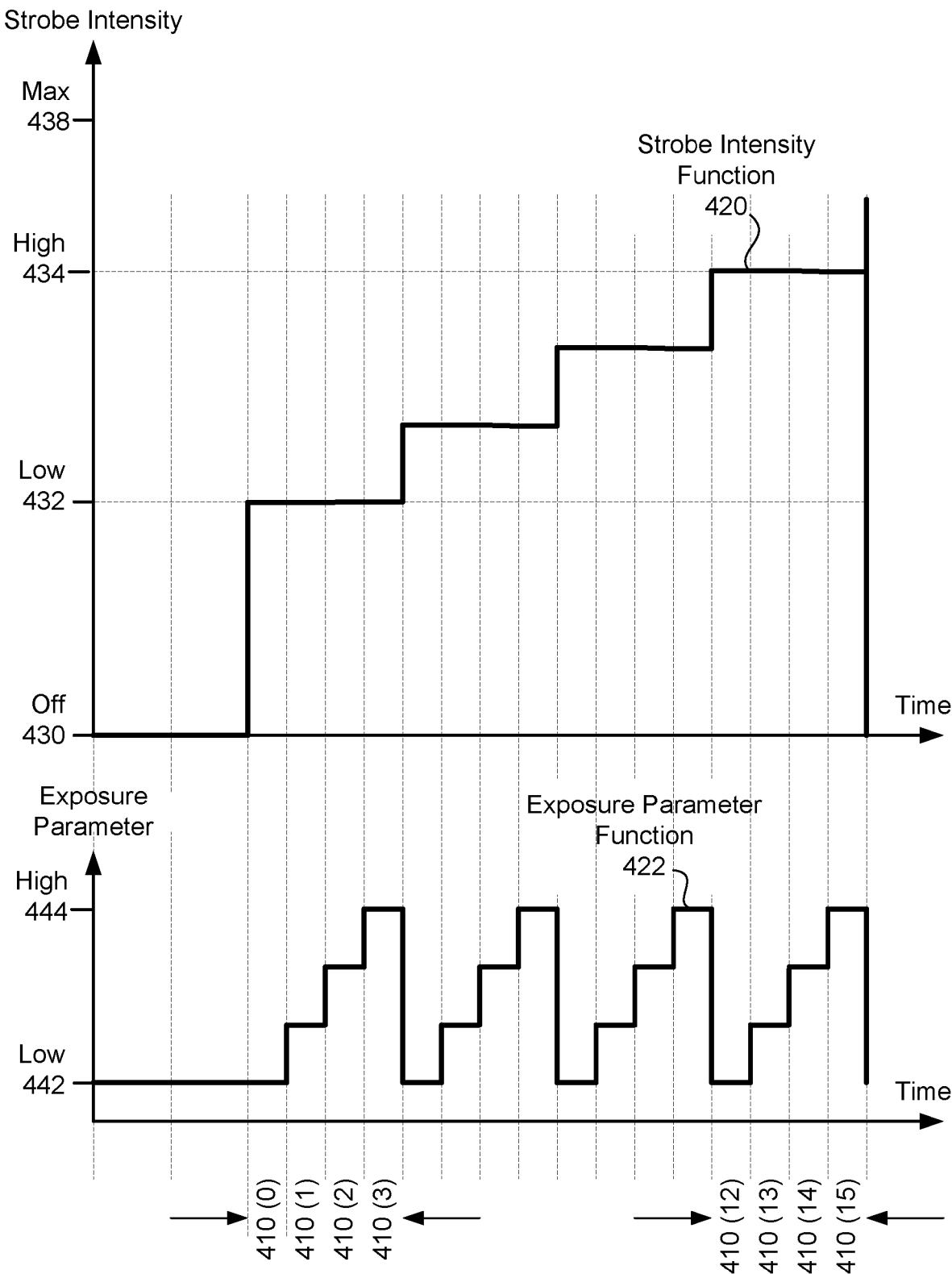
FIG. 4E illustrates a range-limited profile for a strobe intensity function and a non-monotonic profile for an exposure parameter function associated with sampling a set of digital photographs, in accordance with one embodiment.

FIG. 4E illustrates a range-limited profile for a strobe intensity function 420 and a non-monotonic profile for an exposure parameter function 422 associated with sampling a set of digital photographs, in accordance with one embodiment. As shown, the range-limited profile for strobe intensity function 420 and exposure parameter function 422 of FIG. 4D are both modified to provide a two-dimensional sampling of both strobe intensity and an exposure parameter. For each strobe intensity value ranging between low intensity value 432 and high intensity value 434, an image is sampled over each of four different exposure parameter values, as indicated by exposure parameter function 422. Images within the image set may be displayed based on a combination of strobe intensity function 420 and exposure parameter function 422, each separately selected. In this way, an image may be selected from the image set based on substantially separately varying strobe exposure and ambient exposure.

Figure 4F:
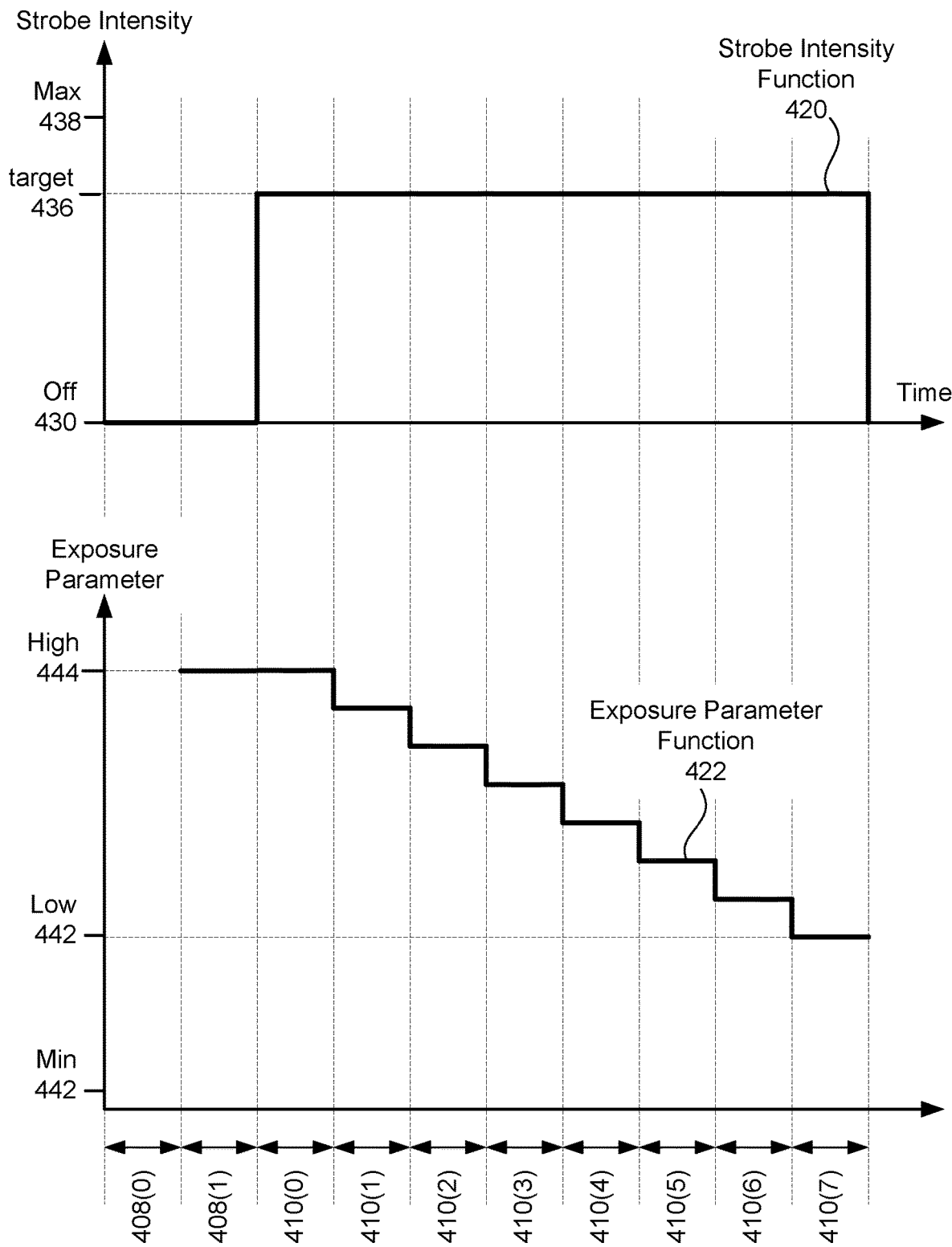
FIG. 4F illustrates a constant intensity profile for a strobe intensity function and a monotonic profile for exposure parameter function associated with sampling a set of digital photographs, in accordance with one embodiment.

FIG. 4F illustrates a constant intensity profile for a strobe intensity function 420 and a monotonic profile for exposure parameter function 422 associated with sampling a set of digital photographs, in accordance with one embodiment. A shown, the strobe intensity profile indicates a substantially constant strobe intensity of target 436, which may be determined using any technically feasible technique to sample images having proper exposure for regions within a photographic scene predominately illuminated by strobe illumination. The value of target 436 may be determined for an exposure parameter between low value 442 and high value 444 to ensure at least one of the images sampled during time intervals 410 may have proper exposure with respect to strobe illumination.

Figure 4G:
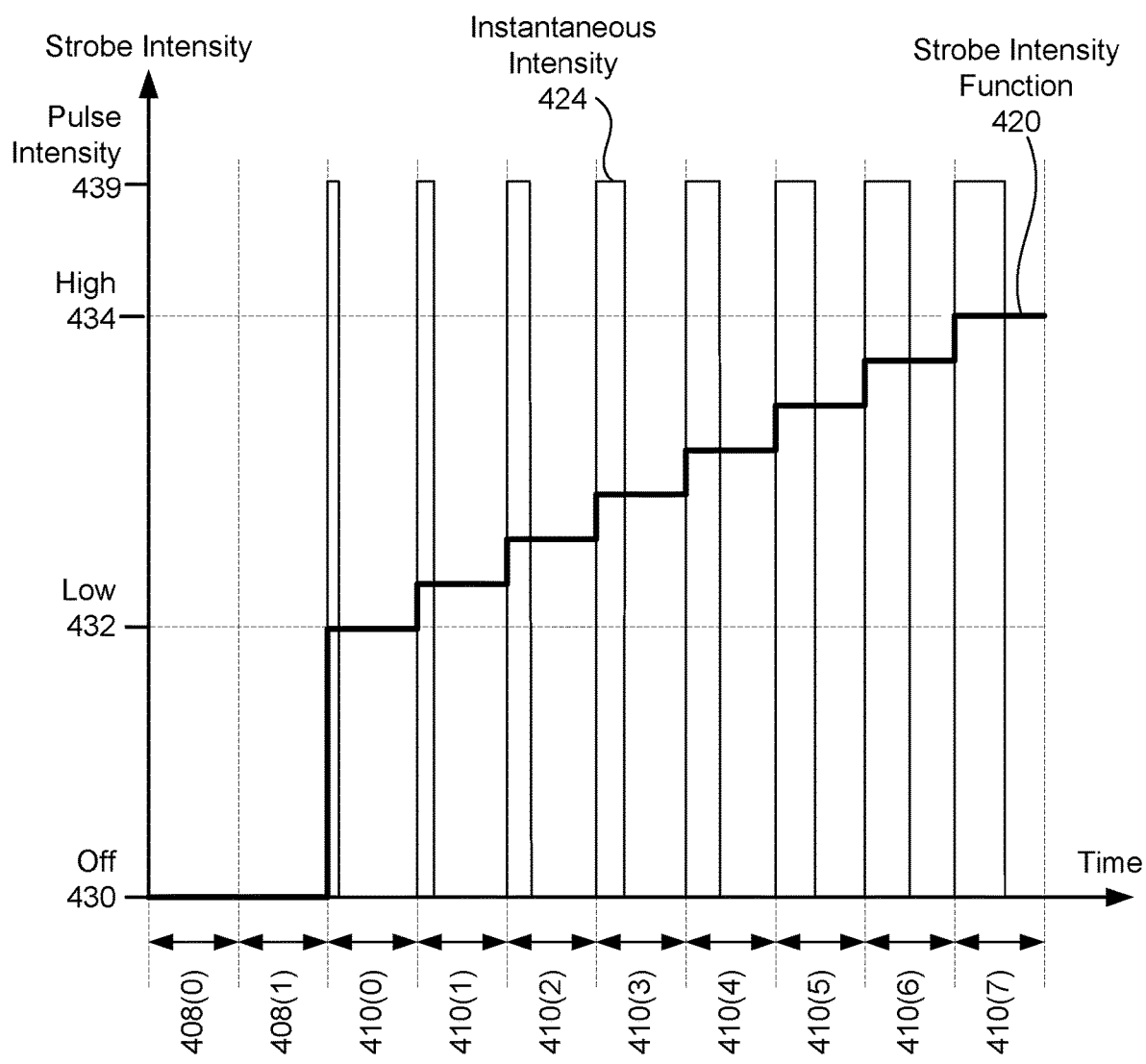
FIG. 4G illustrates a range-limited profile for a strobe intensity function based on variable width pulses, in accordance with one embodiment.

FIG. 4G illustrates a range-limited profile for a strobe intensity function 420 based on variable width pulses, in accordance with one embodiment. An instantaneous intensity 424 illustrates instantaneous strobe intensity as a function of time, while the strobe intensity function 420 represents average strobe intensity during an exposure time for an image sampled within a corresponding time interval 410. Average strobe intensity corresponds to total accumulated instantaneous intensity 424 during a corresponding time interval 410. As shown, the value of strobe intensity function 420 for a given time interval 410 is proportional to a pulse width of a pulse having pulse intensity 439. In one embodiment, each pulse comprising the instantaneous intensity 424 is positioned in time to be within an exposure time for a corresponding image being sampled.

In one embodiment, the strobe unit 336 of FIG. 3A comprises a gas-discharge strobe, such as a xenon tube strobe, and pulse intensity 439 represents the instantaneous intensity of the gas-discharge strobe while actively firing. In one embodiment, time interval 410 represents less than a fifty-millisecond interval.

While a single pulse is shown here in conjunction with achieving a particular average strobe intensity, alternative embodiments may implement strobe intensity averaging over multiple pulses per time interval 410. For example, an LED illuminator device may implement pulse-width modulation (PWM), or other average energy modulation techniques, to achieve a specified average strobe intensity. In such embodiments, multiple pulses should be generated during an associated exposure time. In general, an arbitrary function for instantaneous intensity 424 may be implemented to achieve an average strobe intensity during a given associated exposure time during a corresponding time interval 410. For example, a smooth ramp may be implemented as a function for instantaneous intensity 424, the smooth ramp providing increasing average strobe intensity for during sequential, equal time intervals 410. In certain embodiments, strobe intensity is controlled by controlling a current source configured to drive an illuminator device. In other embodiments, strobe intensity is controlled using a feedback loop that adjusts current driving the illuminator device to match measured optical strobe intensity generated by the strobe unit.

Figure 4H:
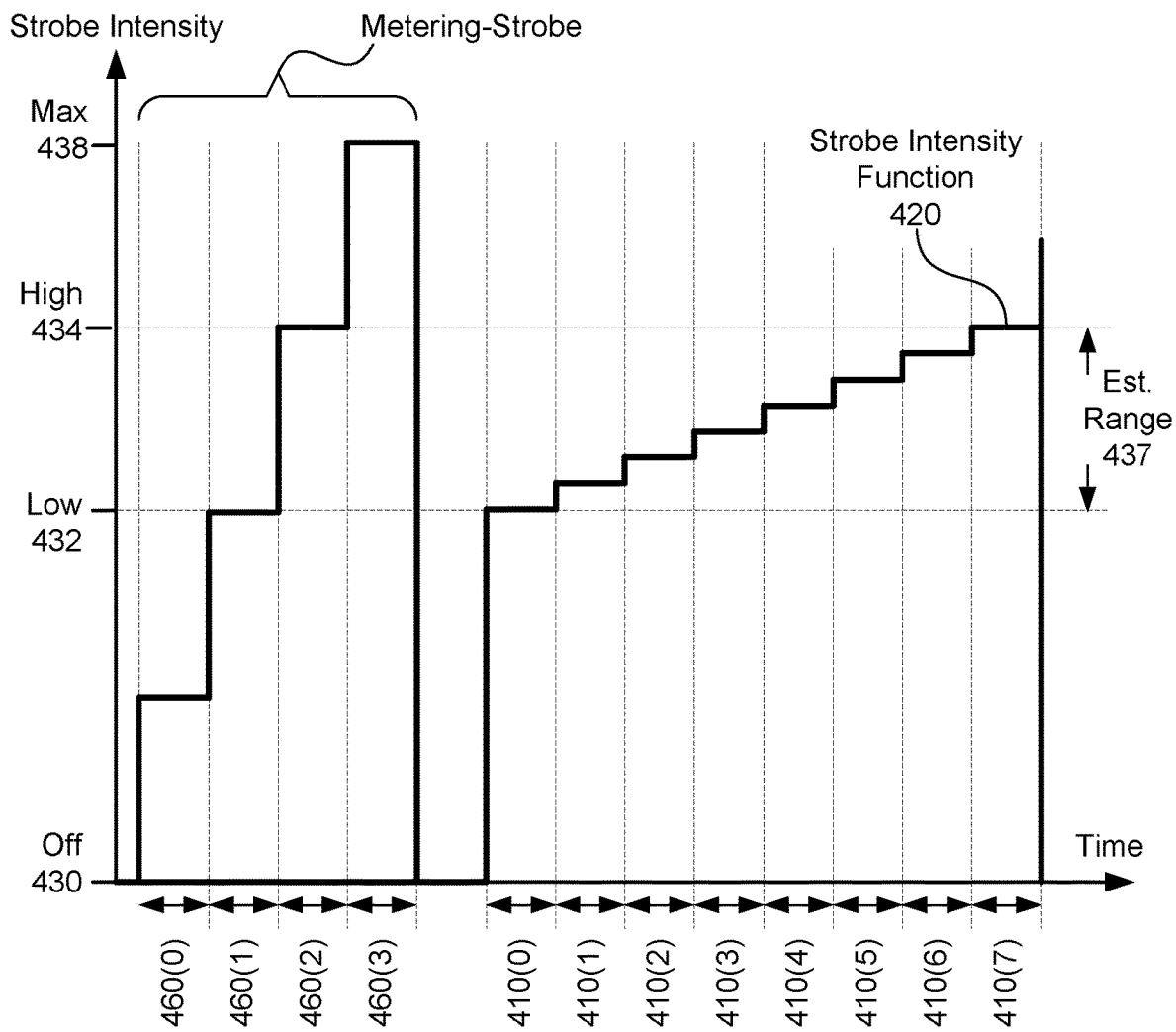
FIG. 4H illustrates determining a range for a range-limited profile, in accordance with one embodiment.

FIG. 4H illustrates determining an intensity range for a range-limited profile, in accordance with one embodiment. Determining the range comprises sampling strobe exposure for a photographic scene subjected strobe illumination during metering-strobe time intervals 460. Strobe intensity is varied during time intervals 460 to estimate the low intensity value 432, below which the photographic scene is underexposed with respect to strobe illumination, and the high value, above which the photographic scene is over-exposed with respect to strobe illumination.

In one embodiment, the maximum intensity 438 is constrained based on ambient illumination rather than strobe unit capacity. In darker settings, the maximum intensity 438 is constrained to an intensity that a person will not find unpleasant. In brighter settings, the maximum intensity 438 may instead be constrained by strobe unit capacity.

In certain embodiments, a digital photographic system is configured to continuously sample ambient images within a circular buffer, and to identify a subset of the ambient images within the circular buffer to be stored as identified ambient images within the image set based on time proximity to a shutter release command. Upon receiving the shutter release command, the identified ambient images are associated with time intervals 408 of FIGS. 4A through 4H, as though sampled according to steps 110 through 116 of method 100 of FIG. 1B. Method 100 may proceed to step 120 upon identifying the ambient images.

Figure 5A:
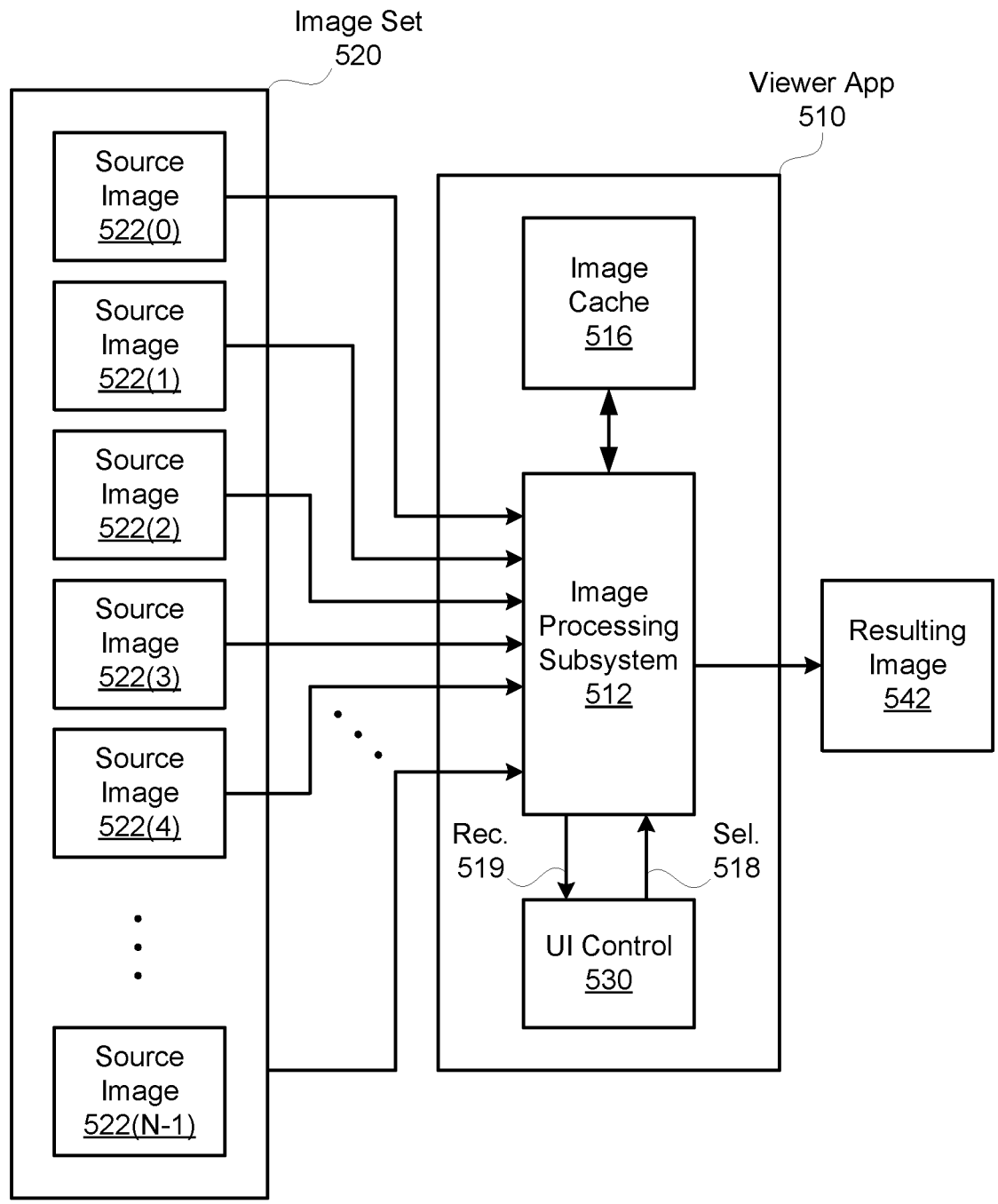
FIG. 5A illustrates a viewer application configured to generate a resulting image based on an image set, in accordance with one embodiment.

FIG. 5A illustrates a viewer application 510 configured to generate a resulting image 542 based an image set 520, in accordance with one embodiment. The image set 520 includes two or more source images 522, which may be generated by performing method 100 of FIG. 1B.

In one embodiment, the resulting image 542 represents a source image 522 that is selected from the image set 520. The source image 522 may be selected according to any technically feasible technique. For example, a given source image 522 may be selected automatically based on based on exposure quality, as described previously in method 100 and in method 102 of FIG. 1C. Alternatively, a given source image 522 may be selected manually through a UI control 530, discussed in greater detail below in FIG. 5B. The UI control 530 generates a selection parameter 518 that indicates the manual selection. An image processing subsystem 512 is configured to generate the resulting image 542 by either instantiating the selected source image 522 or marking the selected source image 522 within the image set 520 as the resulting image 542. In certain embodiments, the image processing subsystem 512 automatically selects a source image and transmits a corresponding recommendation 519 to the UI control 530. The recommendation 519 indicates, through the UI control 530, which source image was automatically selected. A user may keep the recommendation or select a different source image to be the resulting image 542 using the UI control 530.

In an alternative embodiment, viewer application 510 is configured to combine two or more source images 522 to generate a resulting image 542. The two or more source images 522 may be mutually aligned by the image processing subsystem 512 prior to being combined. Selection parameter 518 may include a weight assigned to each of two source images 522. The weight may be used to perform a transparency/opacity blend (known as an alpha blend) between two source images 522.

In certain embodiments, source image 522(0) is sampled under exclusively ambient illumination, with the strobe unit off. Source image 522(0) is generated to be white-balanced, according to any technically feasible white balancing technique. Source images 522(1) through 522(N-1) are sampled under strobe illumination, which may be of a color that is discordant with respect to ambient illumination. Source images 522(1) through 522(N-1) may be white-balanced according to the strobe illumination color. Discordance in strobe illumination color may cause certain regions to appear incorrectly colored with respect to other regions in common photographic settings. For example, in a photographic scene with foreground subjects predominantly illuminated by white strobe illumination and white-balanced accordingly, background subjects that are predominantly illuminated by incandescent lights may appear excessively orange or even red. In one embodiment, spatial color correction is implemented within image processing subsystem 512 to match the color of regions within a selected source image 522 to that of source image 522(0). Spatial color correction implements regional color-matching to ambient-illuminated source image 522(0). The regions may range in overall scene coverage from individual pixels, to blocks of pixels, to whole frames. In one embodiment, each pixel in a color-corrected image includes a weighted color correction contribution from at least a corresponding pixel and an associated block of pixels.

In certain implementations, viewer application 510 includes an image cache 516, configured to include a set of cached images corresponding to the source images 522, but rendered to a lower resolution than source images 522. The image cache 516 provides images that may be used to readily and efficiently generate or display resulting image 542 in response to real-time changes to selection parameter 518. In one embodiment, the cached images are rendered to a screen resolution of display unit 312. When a user manipulates the UI control 530 to select a source image 522, a corresponding cached image may be displayed on the display unit 312. Caching source images 522 may advantageously reduce power consumption associated with rendering a given source image 522 for display. Caching source images 522 may also improve performance by eliminating a rendering process needed to resize a given source image 522 for display each time UI control 530 detects that a user has selected a different source image 522.

Figure 5B:
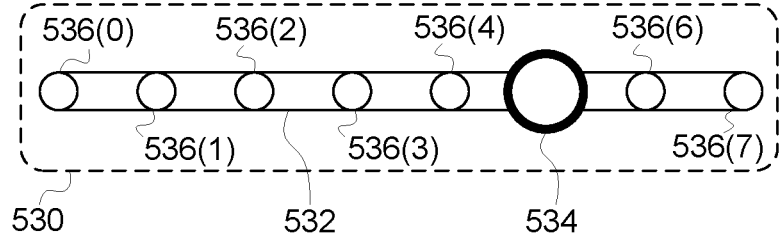
FIG. 5B illustrates an exemplary user interface associated with a viewer application, in accordance with one embodiment.

FIG. 5B illustrates an exemplary user interface associated with the viewer application 510 of FIG. 5A, in accordance with one embodiment. The user interface comprises an application window 540 configured to display the resulting image 542 based on a position of the UI control 530. The viewer application 510 may invoke the UI control 530, configured to generate the selection parameter 518 based on a position of a control knob 534. The recommendation 519 may determine an initial position of the control knob 534, corresponding to a recommended source image 522 within the image set 520. In one embodiment, the UI control 530 comprises a linear slider control with a control knob 534 configured to slide along a slide path 532. A user may position the control knob 534 by performing a slide gesture. For example, the slide gesture may include touching the control knob 534 in a current position, and sliding the control knob 534 to a new position. Alternatively, the user may touch along the slide path 532 to move the control knob 534 to a new position defined by a location of the touch.

In one embodiment, positioning the control knob 534 into a discrete position 536 along the slide path 532 causes the selection parameter 518 to indicate selection of a corresponding source image 522. For example, a user may move control knob 534 into discrete position 536(3), to indicate that source image 522(3) is selected. The UI control 530 then generates selection parameter 518 to indicate that source image 522(3) is selected. The image processing subsystem 512 responds to the selection parameter 518 by generating the resulting image 542 based on source image 522(3). The control knob 534 may be configured to snap to a closest discrete position 536 when released by a user withdrawing their finger.

In an alternative embodiment, the control knob 534 may be positioned between two discrete positions 536 to indicate that resulting image 542 should be generated based on two source images 522 corresponding to the two discrete positions 536. For example, if the control knob 534 is positioned between discrete position 536(3) and discrete position 536(4), then the image processing subsystem 512 generates resulting image 542 from source images 522(3) and 522(4). In one embodiment, the image processing subsystem 512 generates resulting image 542 by aligning source images 522(3) and 522(4), and performing an alpha-blend between the aligned images according to the position of the control knob 534. For example, if the control knob 534 is positioned to be one quarter of the distance from discrete position 536(3) to discrete position 536(4) along slide path 532, then an aligned image corresponding to source image 522(4) may be blended with twenty-five percent opacity over a fully opaque aligned image corresponding to source image 522(3).

In one embodiment, UI control 530 is configured to include a discrete position 536 for each source image 522 within a given image set 520 being viewed. Each image set 520 stored within the digital photographic system 300 of FIG. 3A may include a different number of source images 522, and UI control 530 may be configured to establish discrete positions 536 to correspond to the source images 522 for a given image set 520.

In certain embodiments, the viewer application 510 may implement two or more independent UI controls. For example, the viewer application 510 may implement a first UI control to select a source image 522 according to strobe intensity, and a second UI control to select a source image 522 according to ambient exposure. The first UI control may select among different values of strobe intensity function 420 illustrated in FIG. 4E, while the second UI control may select among different values of exposure parameter function 422. In this way, the viewer application 510 may enable a user to independently adjust exposure with respect to strobe intensity and exposure after an image set has been sampled. In one embodiment, another independent UI control is implemented to select among source images 522 sampled under different strobe illumination colors.

Figure 5C:
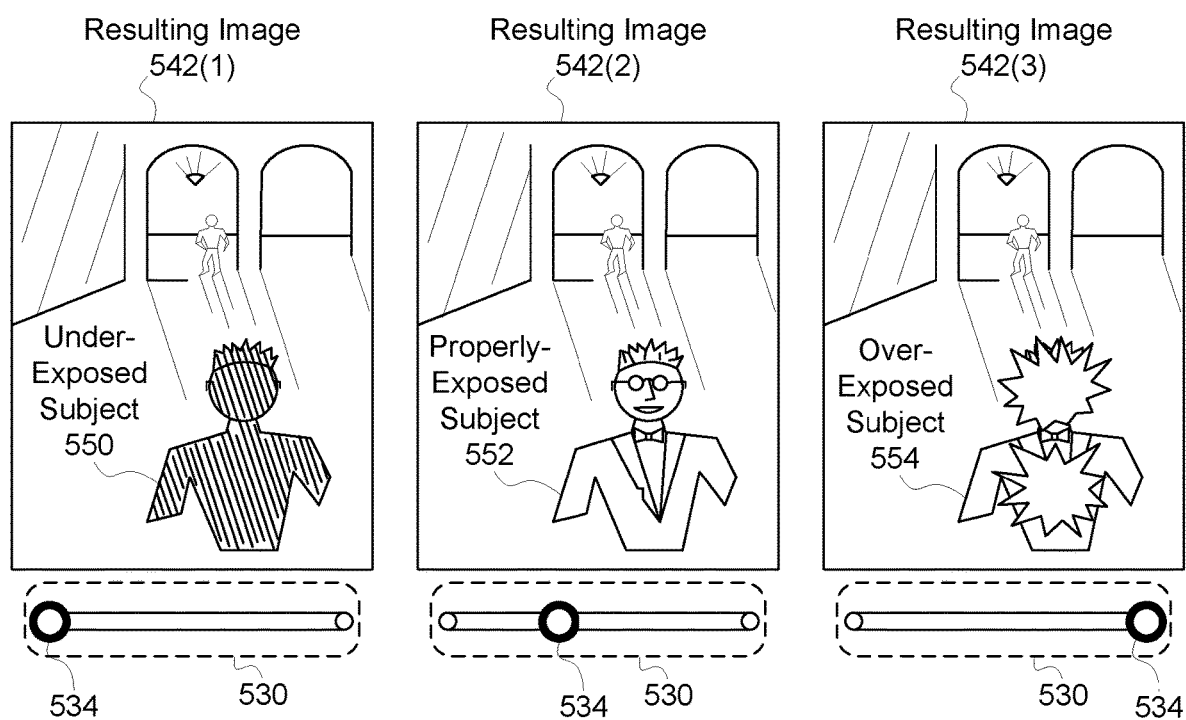
FIG. 5C illustrates a resulting image with differing levels of strobe exposure, in accordance with one embodiment.

FIG. 5C illustrates a resulting image 542 with differing levels of strobe exposure, in accordance with one embodiment. In this example, control knob 534 is configured to select source images 522 of FIG. 5A sampled under increasing strobe intensity from left to right. When the control knob 534 is in the left-most position, the selected source image 522 may correspond to an image captured within time interval 410(0) of FIG. 4A, 4B, 4C, 4D, 4G, or 4H. With respect to FIG. 4E, the left-most control knob position may select a source image captured within time intervals 410(0) through 410(3), with a specific source image 522 selected through a second UI control configured to select according to an exposure parameter. When the control knob 534 is in the right-most position, the selected source image 522 may correspond to an image captured within time interval 410(7) of FIG. 4A, 4B, 4D, 4G, or 4H. In the right-most position, the selected source image 522 may correspond to time interval 410(1) of FIG. 4C, or time intervals 410(12) through 410(15) of FIG. 4E.

As shown, resulting image 542(1) includes an under-exposed subject 550 sampled under insufficient strobe intensity, resulting image 542(2) includes a properly-exposed subject 552 sampled under appropriate strobe intensity, and resulting image 542(3) includes an over-exposed subject 554 sampled under excessive strobe intensity. A determination of appropriate strobe intensity is sometimes subjective, and embodiments of the present invention advantageously enable a user to subjectively select an image having a desirable or appropriate strobe intensity after a picture has been taken, and without loss of image quality or dynamic range. In practice, a user is able to take what is apparently one photograph by asserting a single shutter-release. The single shutter-release causes the digital photographic system 300 of FIG. 3A to sample multiple images in rapid succession, where each of the multiple images is sampled under varying strobe intensity. In one embodiment, time intervals 410 of less than two-hundred milliseconds are defined herein to establish rapid succession. A resulting image set 520 enables the user to advantageously select a resulting image later, such as after a particular photographic scene of interest is no longer available. This is in contrast to prior art solutions that conventionally force a user to manually take different photographs and manually adjust strobe intensity over the different photographs. This manual prior art process typically introduces substantial inter-image delay, resulting in a loss of content consistency among sampled images.

Figure 5D:
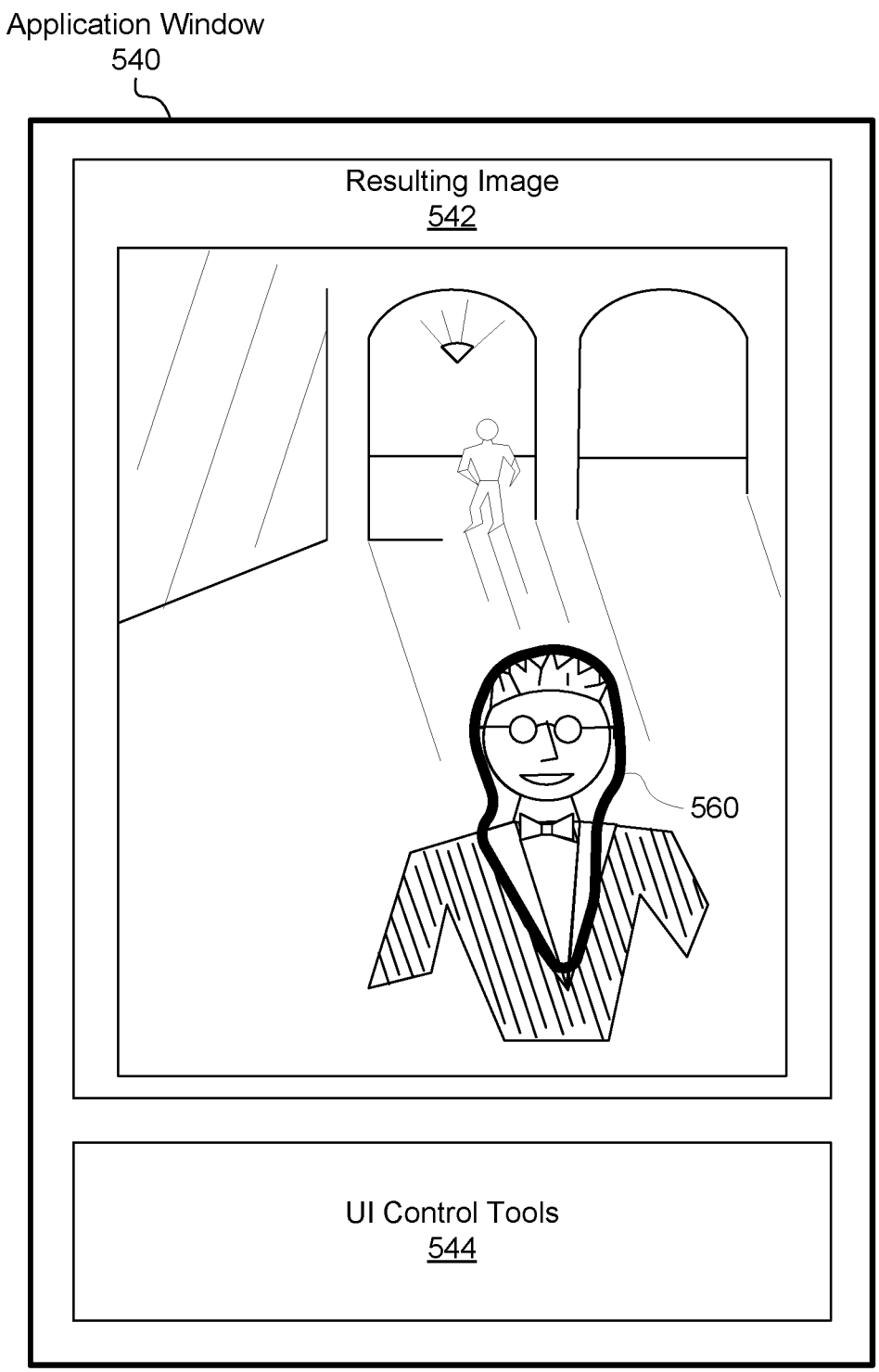
FIG. 5D illustrates a resulting image generated from source images and a selection depth map, in accordance with one embodiment.

FIG. 5D illustrates a resulting image 542 generated from source images 522 and a selection depth map, in accordance with one embodiment. The source images 522 comprising an image set 520 are conceptually stacked in increasing depth, where depth corresponds to strobe intensity for a given source image 522. Increasing depth therefore corresponds to increasing (or decreasing) strobe intensity. The selection depth map includes depth samples organized as a two-dimensional array that corresponds to pixels or regions comprising resulting image 542. A depth value in this context acts similarly to selection parameter 518, but just for a corresponding pixel or region. In certain embodiments, the source images 522 are aligned within the stack.

As shown, selection region 560 encompasses a portion of a foreground subject. Outside the selection region 560, pixel data may be taken from source image 522(0) and represented in the resulting image 542, where source image 522(0) corresponds to a minimum depth value. Inside the selection region 560, pixel data may be taken from source images 522(1) through 522(N-1), based on depth values for a given pixel or region in a selection depth map corresponding to the resulting image 542. Depth information comprising the selection depth map may be generated using any technically feasible technique. One technique is illustrated below in FIGS. 5E and 5F, where swiping over a region multiple times, using a input device such as a mouse or stylus or touch input (such as with a touch-sensitive display), increases depth values associated with the region. In one embodiment, UI control tools 544 include a UI control that sets a minimum depth (minimum strobe intensity) for the selection depth map. UI control tools 544 may also include a UI control to clear the selection depth map.

Figure 5E:
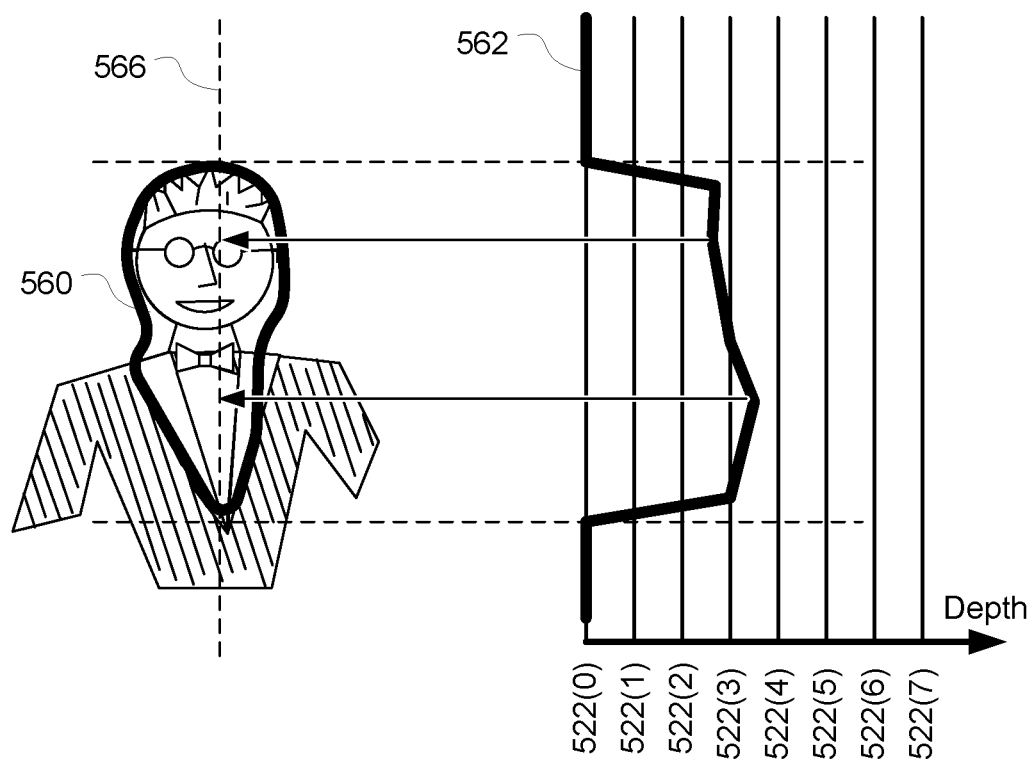
FIG. 5E illustrates a selection depth map relative to a stack of source images, in accordance with one embodiment.

FIG. 5E illustrates a selection depth map relative to a stack of source images 522, in accordance with one embodiment. Depth values for the selection region 560 along an intersecting plane 566 are shown as a depth profile 562. The depth profile 562 corresponds to sequentially organized source images 522(0) through 522(7) comprising a stack. A greater depth value along the depth profile 562 indicates a corresponding selection of a source image 522. A fractional depth value may indicate selection of two source images 522 and a blend between two source images 522.

Figure 5F:
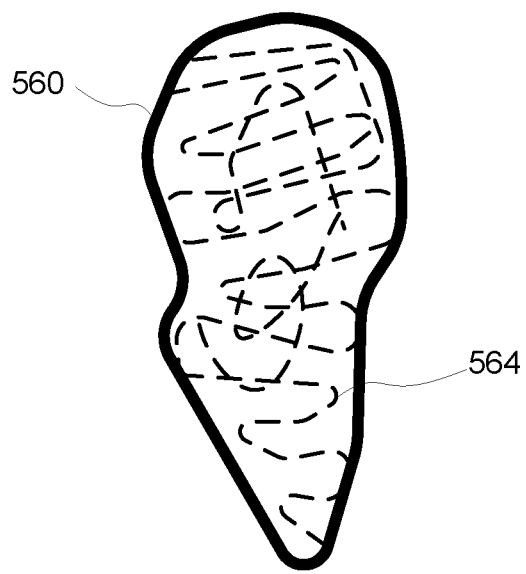
FIG. 5F illustrates specifying a selection depth map, in accordance with one embodiment.

FIG. 5F illustrates specifying a selection depth map, in accordance with one embodiment. As shown, a selection path 564 defines the selection region 560. In one embodiment, a touch-input device is configured to track selection path 564, which may be drawn by a user on the touch-input device. In one embodiment, a depth value for a given region is assigned a value that reflects an accumulation of selection path 564 intersections with the region. For example, a depth value for each pixel in the selection region 560 that intersects with the selection path 564 may be increased by one a specified increment each time the selection path 564 intersects that particular pixel. The specified increment may correspond to a fractional depth value (e.g., 0.25 of a distinct depth increment) separating discrete depths associated with distinct images. So, if the selection path 564 intersects a particular pixel in the selection region 560 three times, the depth value for that pixel may be increased by three specified increments. In one embodiment, the selection path 564 intersects a pixel if the selection path 564 crosses any edge of the pixel. In another embodiment, the selection path 564 intersects a pixel if the selection path crosses any edge of a pixel within n number of pixels from that pixel (i.e., the selection path may intersect with pixels within a certain distance from the selection path). Depth values may accumulate according to any technically feasible technique.

In another embodiment, the selection region 560 is defined by the selection path 564. For example, a closed surface that includes all points in the selection path 564 may be selected as the selection region 560. Further, a closed surface is determined based on the selection path 564 and a set of pre-determined edges in the resulting image 542 and selected as the selection region 560. Once the selection region 560 has been defined, depth values for pixels in the selection region 560 may be incremented uniformly based on the selection path 564. For example, a length of the selection path 564 may be determined by accumulating a distance between points in the selection path 564. Then, all depth values for pixels in the selection region 560 may be incremented by a uniform value calculated as the length of the selection path 564 divided by a normalization factor. In other words, the longer the selection path 564, the greater the increase in depth value for the selection region 560. The normalization factor may be selected such that each incremental step in depth values requires a significant increase in the length of the selection path 564. Such embodiments, enable a user to adjust the depth of a particular region uniformly such that the entire region comprises pixel data from a single image in the image stack.

In one embodiment, depth values around the selection path 564 may accumulate according to a tapering region of influence about the selection path 564 to generate a field of depth samples resembling the effect of an air brush. For example, a window function may be specified that determines a value to increase the depth value corresponding to a pixel based on the distance of that pixel from the selection path 564. For example, pixels intersected by the selection path 564 may be increased by three units of depth value, pixels within one pixel width from the selection path 564, but not intersected by the selection path 564, may be increased by two units of depth value, pixels within two pixel widths from the selection path 564 may be increased by one unit of depth value, and pixels greater than three units of depth value from the selection path 564 may not be increased at all. In another embodiment, the depth values may be fractional depth values. In these embodiments, the window function may return values to increase the depth value of between 0 and 1, where 1 is returned for pixels that are intersected by the selection path 564 and values between [0,1) being returned for pixels not intersected by the selection path 564. The effect of the tapering window function using fractional depth values would be to blend one image associated with a lower depth value with another image associated with a higher depth value around the selection path 564 in order to have a soft transition between the two source images.

One advantage of the present invention is that a user may photograph a scene using a single shutter release command, and subsequently select an image sampled according to a strobe intensity that best satisfies user aesthetic requirements for the photographic scene. The one shutter release command causes a digital photographic system to rapidly sample a sequence of images with a range of strobe intensity and/or color. For example, twenty or more full-resolution images may be sampled within one second, allowing a user to capture a potentially fleeting photographic moment with the advantage of strobe illumination. Embodiments of the present invention advantageously enable a given digital photographic system to capture a nearly optimal image, among images within an image set, given implementation-specific limitations and/or capabilities of the digital photographic system. Furthermore, a user may select an image from the image set according to their subjective aesthetic assessment. Another advantage of the present invention is that a user may easily specify spatially varying contributions of different images within the image set (e.g., the sequence of images) through a simple UI control.

While various embodiments have been described above with respect to a digital camera 202 and a mobile device 204, any device configured to perform the methods 1, 100, or 102 of FIG. 1A, 1B, or 1C is within the scope and spirit of the present invention. In certain embodiments, two or more digital photographic systems implemented in respective devices are configured to sample corresponding image sets in mutual time synchronization. A single shutter release command may trigger the two or more digital photographic systems.

While the foregoing is directed to embodiments of the present invention, other and further embodiments of the invention may be devised without departing from the basic scope thereof, and the scope thereof is determined by the claims that follow.

What is claimed is:

1. A photographic system, comprising:
  a camera module, configured to sample a photographic scene according to exposure parameters;
  one or more processors in communication with the camera module, wherein the one or more processors execute instructions to:
  receive a shutter release command;
  cause the camera module to sample a first image of the photographic scene based on a first set of sampling parameters in response to the shutter release command, wherein the first set of sampling parameters specifies a first set of exposure parameters including a first strobe intensity;
  determine a first depth value for the first image;
  store the first image within an image set;
  cause the camera module to sample a second image of the photographic scene based on a second set of sampling parameters in response to the shutter release command, wherein the second set of sampling parameters specifies a second set of exposure parameters;
  determine a second depth value for the second image;
  store the second image within the image set; and
  generate a resulting image based on the first image, the second image, the first depth value, and the second depth value.

2. The photographic system of claim 1, wherein the first set of exposure parameters specifies a first exposure time, and the second set of exposure parameters specifies a second exposure time.

3. The photographic system of claim 2, wherein the first exposure time of the first set of exposure parameters is substantially equal to the second exposure time of the second set of exposure parameters.

4. The photographic system of claim 1, further configured to:
recommend an image from the image set based on exposure quality metric values associated with images comprising the image set; and
display the recommended image on a display unit.

5. The photographic system of claim 4, wherein each exposure quality metric value comprises a count of overexposed pixels for a corresponding image.

6. The photographic system of claim 1, wherein the first strobe intensity defines an intensity range associated with a strobe intensity function.

7. The photographic system of claim 6, wherein the first strobe intensity is adaptively determined based on at least one previously sampled image.

8. The photographic system of claim 1, wherein causing the camera module to sample the first image is associated with a first time interval of less than two-hundred milliseconds, and causing the camera module to sample the second image is associated with a second time interval of less than two-hundred milliseconds.

9. The photographic system of claim 1, wherein the first strobe intensity is associated with average current driving a light-emitting diode (LED).

10. The photographic system of claim 1, wherein first strobe intensity is associated with pulse duration for a Xenon tube.

11. The photographic system of claim 1, wherein the first strobe intensity is defined by a strobe intensity function.

12. The photographic system of claim 11, wherein the strobe intensity function adaptively generates the first strobe intensity based on at least one previously sampled image or a previously determined exposure.

13. The photographic system of claim 1, wherein the first strobe intensity is for sequential images within the image set.

14. The photographic system of claim 1, wherein the one or more processors further execute instructions to:
select a selection region based on a selection path, and
determine a corresponding depth value associated with the selection region.

15. A computer program product comprising computer executable instructions stored on a non-transitory computer readable medium that, when executed by a processor, instructs the process to:
receive, using one or more processors in communication with a camera module, a shutter release command;
cause the camera module to sample a first image of a photographic scene based on a first set of sampling parameters in response to the shutter release command, wherein the first set of sampling parameters specifies a first set of exposure parameters including a first strobe intensity;
determine a first depth value for the first image;
store the first image within the image set;
cause the camera module to sample a second image of the photographic scene based on a second set of sampling parameters in response to the shutter release command, wherein the second set of sampling parameters specifies a second set of exposure parameters;
determine a second depth value for the second image;
store the second image within the image set;
generate a resulting image based on the first image, the second image, the first depth value, and the second depth value.

16. The computer program product of claim 15, wherein the computer program product is further configured to:
recommend an image from the image set based on exposure quality metric values associated with images comprising the image set; and
display the recommended image on a display unit.

17. The computer program product of claim 15, wherein the first strobe intensity defines an intensity range associated with a strobe intensity function.

18. The computer program product of claim 17, wherein the first strobe intensity is adaptively determined based on at least one previously sampled image.

19. The computer program product of claim 17, wherein the strobe intensity function adaptively generates the first strobe intensity based on at least one previously sampled image or a previously determined exposure.

20. The computer program product of claim 15, wherein the first strobe intensity is for sequential images within the image set.

* * * * *